US009338182B2

(12) United States Patent
Devarapalli et al.

(10) Patent No.: US 9,338,182 B2
(45) Date of Patent: May 10, 2016

(54) DOMAIN NAME SYSTEM SECURITY EXTENSIONS (DNSSEC) FOR GLOBAL SERVER LOAD BALANCING

(71) Applicant: Brocade Communications Systems, Inc., San Jose, CA (US)

(72) Inventors: Sridhar J. Devarapalli, Fremont, CA (US); Prajakta S. Joshi, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 399 days.

(21) Appl. No.: 13/956,241

(22) Filed: Jul. 31, 2013

(65) Prior Publication Data

US 2013/0318602 A1    Nov. 28, 2013

Related U.S. Application Data

(63) Continuation of application No. 12/916,390, filed on Oct. 29, 2010, now Pat. No. 8,549,148.

(60) Provisional application No. 61/393,796, filed on Oct. 15, 2010.

(51) Int. Cl.
  *G06F 15/173* (2006.01)
  *H04L 29/06* (2006.01)
  *H04L 29/12* (2006.01)
  *H04L 29/08* (2006.01)

(52) U.S. Cl.
  CPC ........ *H04L 63/1441* (2013.01); *H04L 61/1511* (2013.01); *H04L 61/6013* (2013.01); *H04L 63/0281* (2013.01); *H04L 67/1002* (2013.01)

(58) Field of Classification Search
  CPC ............ H04L 61/6013; H04L 61/1511; H04L 67/1002; H04L 63/0281; H04L 63/1441
  See application file for complete search history.

(56) References Cited

U.S. PATENT DOCUMENTS

| | | |
|---|---|---|
| 5,031,094 A | 7/1991 | Toegel et al. |
| 5,359,593 A | 10/1994 | Derby et al. |
| 5,539,883 A | 7/1996 | Allon et al. |
| 5,867,706 A | 2/1999 | Martin et al. |
| 5,918,017 A | 6/1999 | Attanasio et al. |
| 5,948,061 A | 9/1999 | Merriman et al. |
| 5,951,634 A | 9/1999 | Sitbon et al. |

(Continued)

FOREIGN PATENT DOCUMENTS

| | | |
|---|---|---|
| EP | 1128613 | 8/2001 |
| WO | 01/39003 | 5/2001 |
| WO | 01/93530 | 12/2001 |

OTHER PUBLICATIONS

Zhou, "Web Server Load Balancers", 2000, Windows IP Pro, http://sindowstipro.com/networking/web-server-load-balancers, 7 pages.

(Continued)

*Primary Examiner* — Yves Dalencourt
(74) *Attorney, Agent, or Firm* — Fountainhead Law Group P.C.

(57) ABSTRACT

Techniques are provided to enable a network device, such as a switch, to perform global server load balancing (GSLB) while operating as a proxy to a domain name system security extensions (DNSSEC)-capable authoritative DNS server. The network device preserves an original signature generated by the DNSSEC-capable authoritative DNS server for a resource record set contained in a DNSSEC reply.

20 Claims, 5 Drawing Sheets

(56) References Cited

U.S. PATENT DOCUMENTS

| | | | |
|---|---|---|---|
| 6,006,269 | A | 12/1999 | Phaal |
| 6,006,333 | A | 12/1999 | Nielsen |
| 6,078,956 | A | 6/2000 | Bryant et al. |
| 6,092,178 | A | 7/2000 | Jindal et al. |
| 6,112,239 | A | 8/2000 | Kenner et al. |
| 6,115,752 | A | 9/2000 | Chauhan |
| 6,119,143 | A | 9/2000 | Dias et al. |
| 6,128,279 | A | 10/2000 | O'Neil et al. |
| 6,128,642 | A | 10/2000 | Doraswamy et al. |
| 6,134,588 | A | 10/2000 | Guenthner et al. |
| 6,148,410 | A | 11/2000 | Baskey et al. |
| 6,157,649 | A | 12/2000 | Peirce et al. |
| 6,167,445 | A | 12/2000 | Gai et al. |
| 6,167,446 | A | 12/2000 | Lister et al. |
| 6,178,160 | B1 | 1/2001 | Bolton et al. |
| 6,182,139 | B1 | 1/2001 | Brendel |
| 6,185,619 | B1 | 2/2001 | Joffe et al. |
| 6,195,691 | B1 | 2/2001 | Brown |
| 6,205,477 | B1 | 3/2001 | Johnson et al. |
| 6,233,604 | B1 | 5/2001 | Van Horne et al. |
| 6,249,801 | B1 | 6/2001 | Zisapel et al. |
| 6,260,070 | B1 | 7/2001 | Shah |
| 6,262,976 | B1 | 7/2001 | McNamara |
| 6,286,039 | B1 | 9/2001 | Van Horne et al. |
| 6,286,047 | B1 | 9/2001 | Ramanathan et al. |
| 6,304,913 | B1 | 10/2001 | Rune |
| 6,317,775 | B1 | 11/2001 | Coile et al. |
| 6,324,177 | B1 | 11/2001 | Howes et al. |
| 6,324,580 | B1 | 11/2001 | Jindal et al. |
| 6,327,622 | B1 | 12/2001 | Jindal et al. |
| 6,336,137 | B1 | 1/2002 | Lee et al. |
| 6,381,627 | B1 | 4/2002 | Kwan et al. |
| 6,389,462 | B1 | 5/2002 | Cohen et al. |
| 6,393,473 | B1 | 5/2002 | Chu |
| 6,405,252 | B1 | 6/2002 | Gupta et al. |
| 6,411,998 | B1 | 6/2002 | Bryant et al. |
| 6,427,170 | B1 | 7/2002 | Sitaraman et al. |
| 6,434,118 | B1 | 8/2002 | Krischenbaum |
| 6,438,652 | B1 | 8/2002 | Jordan et al. |
| 6,446,121 | B1 | 9/2002 | Shah et al. |
| 6,449,657 | B2 | 9/2002 | Stanbach, Jr. et al. |
| 6,470,389 | B1 | 10/2002 | Chung et al. |
| 6,473,802 | B2 | 10/2002 | Masters |
| 6,480,508 | B1 | 11/2002 | Mwikalo et al. |
| 6,487,555 | B1 | 11/2002 | Bharat et al. |
| 6,490,624 | B1 | 12/2002 | Sampson et al. |
| 6,513,061 | B1 | 1/2003 | Ebata et al. |
| 6,542,964 | B1 | 4/2003 | Scharber |
| 6,549,944 | B1 | 4/2003 | Weinberg et al. |
| 6,578,066 | B1 | 6/2003 | Logan et al. |
| 6,578,077 | B1 | 6/2003 | Rakoshitz et al. |
| 6,601,084 | B1 | 7/2003 | Bhaskaran et al. |
| 6,606,643 | B1 | 8/2003 | Emens et al. |
| 6,611,861 | B1 | 8/2003 | Schairer et al. |
| 6,647,009 | B1 | 11/2003 | Kubota et al. |
| 6,665,702 | B1 | 12/2003 | Zisapel et al. |
| 6,681,232 | B1 | 1/2004 | Sistanizadeh et al. |
| 6,681,323 | B1 | 1/2004 | Fontanesi et al. |
| 6,684,250 | B2 | 1/2004 | Anderson et al. |
| 6,691,165 | B1 | 2/2004 | Bruck et al. |
| 6,718,387 | B1 | 4/2004 | Gupta et al. |
| 6,725,253 | B1 | 4/2004 | Okano et al. |
| 6,745,241 | B1 | 6/2004 | French et al. |
| 6,748,416 | B2 | 6/2004 | Carpenter et al. |
| 6,754,699 | B2 | 6/2004 | Swildens et al. |
| 6,760,775 | B1 | 7/2004 | Anerousis |
| 6,772,211 | B2 | 8/2004 | Lu et al. |
| 6,779,017 | B1 | 8/2004 | Lamberton et al. |
| 6,785,704 | B1 | 8/2004 | McCanne |
| 6,789,125 | B1 | 9/2004 | Aviani et al. |
| 6,795,434 | B1 | 9/2004 | Kumar et al. |
| 6,795,858 | B1 | 9/2004 | Jain et al. |
| 6,795,860 | B1 | 9/2004 | Shah |
| 6,801,949 | B1 | 10/2004 | Bruck et al. |
| 6,810,411 | B1 | 10/2004 | Coughlin et al. |
| 6,826,198 | B2 | 11/2004 | Turina et al. |
| 6,839,700 | B2 | 1/2005 | Doyle et al. |
| 6,850,984 | B1 | 2/2005 | Kalkunte et al. |
| 6,862,627 | B1 | 3/2005 | Cheshire |
| 6,874,152 | B2 | 3/2005 | Vermeire et al. |
| 6,879,995 | B1 | 4/2005 | Chinta et al. |
| 6,880,000 | B1 | 4/2005 | Tominaga et al. |
| 6,883,028 | B1 | 4/2005 | Johnson et al. |
| 6,898,633 | B1 | 5/2005 | Lyndersay et al. |
| 6,901,081 | B1 | 5/2005 | Ludwig |
| 6,920,498 | B1 | 7/2005 | Gourlay et al. |
| 6,928,485 | B1 | 8/2005 | Krishnamurthy et al. |
| 6,950,848 | B1 | 9/2005 | Yousefi'zadeh |
| 6,963,914 | B1 | 11/2005 | Breitbart et al. |
| 6,963,917 | B1 | 11/2005 | Callis et al. |
| 6,968,389 | B1 | 11/2005 | Menditto et al. |
| 6,985,956 | B2 | 1/2006 | Luke et al. |
| 6,987,763 | B2 | 1/2006 | Rochberger et al. |
| 6,996,615 | B1 | 2/2006 | McGuire |
| 6,996,616 | B1 | 2/2006 | Leighton et al. |
| 7,000,007 | B1 | 2/2006 | Valenti |
| 7,020,698 | B2 | 3/2006 | Andrews et al. |
| 7,020,714 | B2 | 3/2006 | Kalyanaraman et al. |
| 7,028,083 | B2 | 4/2006 | Levine et al. |
| 7,032,010 | B1 | 4/2006 | Swildens et al. |
| 7,032,031 | B2 | 4/2006 | Jungck et al. |
| 7,036,039 | B2 | 4/2006 | Holland |
| 7,047,300 | B1 | 5/2006 | Oehrke et al. |
| 7,058,706 | B1 | 6/2006 | Iyer et al. |
| 7,058,717 | B2 | 6/2006 | Chao et al. |
| 7,062,562 | B1 | 6/2006 | Baker et al. |
| 7,062,642 | B1 | 6/2006 | Langrind et al. |
| 7,080,138 | B1 | 7/2006 | Baker et al. |
| 7,082,102 | B1 | 7/2006 | Wright |
| 7,086,061 | B1 | 8/2006 | Joshi et al. |
| 7,089,293 | B2 | 8/2006 | Grosner et al. |
| 7,099,915 | B1 | 8/2006 | Tenereillo et al. |
| 7,114,008 | B2 | 9/2006 | Jungck et al. |
| 7,117,269 | B2 | 10/2006 | Lu et al. |
| 7,117,530 | B1 | 10/2006 | Lin |
| 7,124,188 | B2 | 10/2006 | Mangipudi et al. |
| 7,127,713 | B2 | 10/2006 | Davis et al. |
| 7,136,932 | B1 | 11/2006 | Schneider et al. |
| 7,139,242 | B2 | 11/2006 | Bays |
| 7,177,933 | B2 | 2/2007 | Foth |
| 7,185,052 | B2 | 2/2007 | Day |
| 7,194,553 | B2 | 3/2007 | Lucco et al. |
| 7,197,547 | B1 | 3/2007 | Miller et al. |
| 7,206,806 | B2 | 4/2007 | Pineau |
| 7,213,068 | B1 | 5/2007 | Kohli et a |
| 7,225,272 | B2 | 5/2007 | Kelley et al. |
| 7,240,015 | B1 | 7/2007 | Karmouch et al. |
| 7,240,100 | B1 | 7/2007 | Wein et al. |
| 7,254,626 | B1 | 8/2007 | Kommula et al. |
| 7,257,642 | B1 | 8/2007 | Bridger et al. |
| 7,260,645 | B2 | 8/2007 | Bays |
| 7,277,954 | B1 | 10/2007 | Stewart et al. |
| 7,289,519 | B1 | 10/2007 | Liskov |
| 7,296,088 | B1 | 11/2007 | Padmanabhan et al. |
| 7,321,926 | B1 | 1/2008 | Zhang et al. |
| 7,330,908 | B2 | 2/2008 | Jungck |
| 7,383,288 | B2 | 6/2008 | Miloushev et al. |
| 7,423,977 | B1 | 9/2008 | Joshi et al. |
| 7,441,045 | B2 | 10/2008 | Skene et al. |
| 7,447,739 | B1 | 11/2008 | Cunetto et al. |
| 7,454,500 | B1 | 11/2008 | Hsu et al. |
| 7,478,148 | B2 | 1/2009 | Neerdaels |
| 7,496,651 | B1 | 2/2009 | Joshi |
| 7,523,181 | B2 | 4/2009 | Swildens et al. |
| 7,573,886 | B1 | 8/2009 | Ono |
| 7,574,508 | B1 | 8/2009 | Kommula |
| 7,581,006 | B1 | 8/2009 | Lara et al. |
| 7,581,009 | B1 | 8/2009 | Hsu et al. |
| 7,584,262 | B1 | 9/2009 | Wang et al. |
| 7,584,301 | B1 | 9/2009 | Joshi |
| 7,594,262 | B2 | 9/2009 | Hanzlik et al. |
| 7,653,700 | B1 | 1/2010 | Bahl et al. |
| 7,657,629 | B1 | 2/2010 | Kommula |
| 7,676,576 | B1 | 3/2010 | Kommula |

(56) References Cited

U.S. PATENT DOCUMENTS

| | | | |
|---|---|---|---|
| 7,756,965 B2 | 7/2010 | Joshi | |
| 7,792,113 B1 | 9/2010 | Foschiano et al. | |
| 7,840,678 B2 | 11/2010 | Joshi | |
| 7,860,964 B2 | 12/2010 | Brady et al. | |
| 7,885,188 B2 | 2/2011 | Joshi | |
| 7,899,899 B2 | 3/2011 | Joshi | |
| 7,925,713 B1 | 4/2011 | Day et al. | |
| 7,949,757 B2 | 5/2011 | Joshi | |
| 8,024,441 B2 | 9/2011 | Kommula et al. | |
| 8,504,721 B2 | 8/2013 | Hsu et al. | |
| 2001/0049741 A1 | 12/2001 | Skene et al. | |
| 2001/0052016 A1 | 12/2001 | Skene et al. | |
| 2002/0026551 A1 | 2/2002 | Kamimaki et al. | |
| 2002/0038360 A1 | 3/2002 | Andrews et al. | |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | |
| 2002/0078233 A1 | 6/2002 | Biliris et al. | |
| 2002/0087722 A1 | 7/2002 | Datta et al. | |
| 2002/0091840 A1 | 7/2002 | Pulier et al. | |
| 2002/0112036 A1 | 8/2002 | Bohannon et al. | |
| 2002/0120743 A1 | 8/2002 | Shabtay et al. | |
| 2002/0120763 A1 | 8/2002 | Miloushev et al. | |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0186698 A1 | 12/2002 | Ceniza | |
| 2002/0188862 A1 | 12/2002 | Trethewey et al. | |
| 2002/0194324 A1 | 12/2002 | Guha | |
| 2002/0194335 A1 | 12/2002 | Maynard | |
| 2003/0018796 A1 | 1/2003 | Chou et al. | |
| 2003/0031185 A1 | 2/2003 | Kikuchi et al. | |
| 2003/0035430 A1 | 2/2003 | Islam et al. | |
| 2003/0065711 A1 | 4/2003 | Acharya et al. | |
| 2003/0065762 A1 | 4/2003 | Stolorz et al. | |
| 2003/0065763 A1 | 4/2003 | Swildens et al. | |
| 2003/0074472 A1 | 4/2003 | Lucco et al. | |
| 2003/0105797 A1 | 6/2003 | Dolev et al. | |
| 2003/0115283 A1 | 6/2003 | Barbir et al. | |
| 2003/0135509 A1 | 7/2003 | Davis et al. | |
| 2003/0154239 A1 | 8/2003 | Davis et al. | |
| 2003/0210686 A1 | 11/2003 | Terrell et al. | |
| 2003/0210694 A1 | 11/2003 | Jayaraman et al. | |
| 2003/0229697 A1 | 12/2003 | Borella | |
| 2004/0019680 A1 | 1/2004 | Chao et al. | |
| 2004/0024872 A1 | 2/2004 | Kelley et al. | |
| 2004/0039798 A1 | 2/2004 | Hotz et al. | |
| 2004/0039847 A1 | 2/2004 | Persson et al. | |
| 2004/0064577 A1 | 4/2004 | Dahlin et al. | |
| 2004/0078487 A1* | 4/2004 | Cernohous | H04L 29/12009 709/245 |
| 2004/0194102 A1 | 9/2004 | Neerdaels | |
| 2004/0249939 A1 | 12/2004 | Amini et al. | |
| 2004/0249971 A1 | 12/2004 | Klinker | |
| 2004/0259565 A1 | 12/2004 | Lucidarme | |
| 2005/0002410 A1 | 1/2005 | Chao et al. | |
| 2005/0021883 A1 | 1/2005 | Shishizuka et al. | |
| 2005/0033858 A1 | 2/2005 | Swildens et al. | |
| 2005/0086295 A1 | 4/2005 | Cunningham et al. | |
| 2005/0149531 A1 | 7/2005 | Srivastava | |
| 2005/0169180 A1 | 8/2005 | Ludwig | |
| 2005/0286416 A1 | 12/2005 | Shimonishi et al. | |
| 2006/0020715 A1 | 1/2006 | Jungck | |
| 2006/0036743 A1 | 2/2006 | Deng et al. | |
| 2006/0167894 A1 | 7/2006 | Wunner | |
| 2006/0209689 A1 | 9/2006 | Nakano et al. | |
| 2007/0168448 A1 | 7/2007 | Garbow et al. | |
| 2007/0168547 A1 | 7/2007 | Krywaniuk | |
| 2007/0180113 A1 | 8/2007 | Van Bemmel | |
| 2007/0208877 A1 | 9/2007 | Kelley et al. | |
| 2008/0016233 A1 | 1/2008 | Schneider | |
| 2008/0037420 A1 | 2/2008 | Tang | |
| 2008/0123597 A1 | 5/2008 | Arbol et al. | |
| 2008/0144784 A1 | 6/2008 | Limberg | |
| 2008/0147866 A1 | 6/2008 | Stolorz et al. | |
| 2010/0010991 A1 | 1/2010 | Joshi | |
| 2010/0011120 A1 | 1/2010 | Kommula | |
| 2010/0011126 A1* | 1/2010 | Hsu | H04L 67/1008 709/249 |
| 2010/0061236 A1 | 3/2010 | Joshi | |
| 2010/0082787 A1 | 4/2010 | Kommula et al. | |
| 2010/0095008 A1 | 4/2010 | Joshi | |
| 2010/0115133 A1 | 5/2010 | Joshi | |
| 2010/0121932 A1 | 5/2010 | Joshi et al. | |
| 2010/0153558 A1 | 6/2010 | Kommula | |
| 2010/0223621 A1 | 9/2010 | Joshi | |
| 2010/0293296 A1 | 11/2010 | Hsu et al. | |
| 2010/0299427 A1 | 11/2010 | Joshi | |
| 2011/0099261 A1 | 4/2011 | Joshi | |
| 2011/0122771 A1 | 5/2011 | Joshi | |
| 2011/0191459 A1 | 8/2011 | Joshi | |
| 2011/0264798 A1 | 10/2011 | Joshi | |
| 2012/0324089 A1 | 12/2012 | Joshi | |

OTHER PUBLICATIONS

Hasenstein, "IP Address Translation", 1997, http://www.csn.tu.chemnitz.de/HyperNews/get/linux-ip-nat-html, 50 pages.

Hasenstein, "Linux IP Network Address Translation", Dec. 2003, Linux IP NAT Forum, http://www.hasenstein/com/HyperNews/get/linux-ip-nat.html, 12 pages.

Decision of Petition for Reconsideration of Sep. 10, 2012 Decision (Denied) for Reexamination Control No. 95/001,806 mailed Jul. 1, 2013, 23 pages.

Decision Dismissing Petition to Expunge Comments and Action Closing Prosecution for Reexamination Control No. 95/001,806 mailed Jul. 10, 2013, 8 pages.

Non-Final Office Action for U.S. Appl. No. 12/272,618 mailed on Jul. 29, 2013, 13 pages.

Right of Appeal Notice for Reexamination Control No. 95/001,807 mailed Jul. 24, 2013, 23 pages.

Non-Final Office Action for U.S. Appl. No. 11/429,177 mailed Jun. 21, 2013, 14 pages.

Non-Final Office Action for U.S. Appl. No. 12/506,137 mailed on Jun. 7, 2013, 19 pages.

Non-Final Office Action for U.S. Appl. No. 10/674,627 mailed on Jul. 18, 2013, 9 pages.

Examiner's Answer to Appeal Brief for Reexamination Control No. 90/011,812 mailed on Jun. 20, 2013, 26 pages.

Decision on Appeal (Affirmance) for Reexamination Control No. 90/011,763 mailed Jul. 24, 2013, 14 pages.

Examiner's Answer to Appeal Brief for Reexamination Control No. 95/001,822 filed Jul. 17, 2013, 25 pages.

Patent Owner's Petition Under 37 C.F.R. § 1.182 to Terminate the Reexamination Proceeding for Reexamination Control No. 95/001,827 filed Jul. 10, 2013, 8 pages.

Patent Owner's Reply Brief Pursuant to 37 C.F.R. § 41.41 for Reexamination Control No. 90/011,760 filed Jul. 1, 2013, 14 pages.

Notice of Allowance for U.S. Appl. No. 12/916,390 mailed on Jun. 24, 2013, 6 pages.

Patent Owner's Petition Under 37 C.F.R. § 1.182 to Terminate the Reexamination Proceeding for Reexamination Control No. 95/001,826 filed Jul. 10, 2013, 8 pages.

Notice of Assignment of Inter Partes Reexamination Request and Notice of Reexamination Request Filing Date, mailed Nov. 18, 2011, Reexamination Control No. 95/001,806, 2 pages.

Order Granting Request for Inter Partes Reexamination of U.S. Pat. No. 7,454,500 and Office Action for Reexamination Control No. 95/001,806, mailed Dec. 16, 2011, 43 pages.

Third Party Requester's Opposition to Petition to Vacate, for Reexamination Control No. 95/001,806, filed Mar. 1, 2012, 15 pages.

Third Party Requester's Opposition to Petition to Suspend Reexamination for Reexamination Control No. 95/001,806, filed Mar. 2, 2012, 14 pages.

Third Party Requester's Comments under 35 U.S.C. § 314(B)(2) and 37 C.F.R. § 1.947, for Reexamination Control No. 95/001,806, filed Mar. 19, 2012, 36 pages.

Third Party Requester's Opposition to Patent Owner's Petition to

(56) References Cited

OTHER PUBLICATIONS

"Supplement," for Reexamination Control No. 95/001,806, filed Apr. 19, 2012, 21 pages.
Terminal Disclaimer for U.S. Appl. No. 11/741,480, filed Jan. 29, 2008, 1 page.
Request for Reexamination of U.S. Pat. No. 7,581,009, filed Jun. 27, 2011, 58 pages.
Notice of Reexamination Request Filing Date and Notice of Assignment of Reexamination Request, mailed Jul. 8, 2011, Reexamination Control No. 90/011,770, 2 pages.
Ex Parte Reexamination Interview Summary, for Reexamination Control No. 90/011,770, mailed Jul. 18, 2011, 2 pages.
Order Granting Request for Reexamination of U.S. Pat. No. 7,581,009, mailed Sep. 21, 2011, Reexamination Control No. 90/011,770, 14 pages.
Office Action for Reexamination Control No. 90/011,770, mailed Feb. 16, 2012, 35 pages.
Ex Parte Reexamination Interview Summary, for Reexamination Control No. 90/011,770, mailed Mar. 27, 2012, 3 pages.
Decision on Petition for Extension of Time in Reexamination (Granted), mailed Mar. 28, 2012, Reexamination Control No. 90/011,770, 3 pages.
Request for Inter Partes Reexamination of U.S. Pat. No. 7,581,009, filed Nov. 4, 2011, 197 pages.
Notice of Assignment of Inter Partes Reexamination Request and Notice of Reexamination Request Filing Date, mailed Nov. 10, 2011, Reexamination Control No. 95/001,807, 2 pages.
Order Granting Request for Inter Partes Reexamination of U.S. Pat. No. 7,581,009 and Office Action for Reexamination Control No. 95/001,807, mailed Jan. 31, 2012, 23 pages.
Decision on Petition for Extension of Time in Reexamination (Granted), mailed Mar. 30, 2012, Reexamination Control No. 95/001,807, 3 pages.
Third Party Requester's Opposition to Petition to Vacate, for Reexamination Control No. 95/001,807, filed Apr. 16, 2012, 17 pages.
Third Party Requester's Comments under 35 U.S.C. § 314(B)(2) and 37 C.F.R. § 1.947, with Exhibits 1-7, for Reexamination Control No. 95/001,807, filed May 30, 2012, 145 pages.
Third Party Requester's Refiling of Certificate of Service for Requester Comments, for Reexamination Control No. 95/001,807, filed Jun. 21, 2012, 3 pages.
Third Party Requester's Opposition to Petition to Refuse Entry of Requester's Comments, for Reexamination Control No. 95/001,807, filed Jul. 12, 2012, 5 pages.
Notice of Allowance for U.S. Appl. No. 12/496,560, mailed on May 16, 2011, 11 pages.
Office Communication for U.S. Appl. No. 12/496,560, mailed on Jun. 14, 2011, 5 pages.
Office Action for U.S. Appl. No. 12/496,560, mailed on Jun. 15, 2012, 30 pages.
Non-Final Office Action for U.S. Appl. No. 12/272,618, mailed on Jun. 14, 2011, 13 pages.
Final Office Action for U.S. Appl. No. 12/272,618, mailed on Feb. 28, 2012, 12 pages.
Non-Final Office Action for U.S. Appl. No. 11/429,177, mailed May 19, 2011, 87 pages.
Non-Final Office Action for U.S. Appl. No. 11/429,177, mailed Oct. 18, 2011, 25 pages.
Final Office Action for U.S. Appl. No. 11/429,177, mailed Jun. 20, 2012, 47 pages.
Request for Reexamination of U.S. Pat. No. 7,657,629, filed Jun. 27, 2011, 36 pages.
Notice of Reexamination Request Filing Date and Notice of Assignment of Reexamination Request, mailed Jul. 7, 2011, Reexamination Control No. 90/011,766, 2 pages.
Ex Parte Interview Summary for Reexamination Control No. 90/011,766, Jul. 14, 2011, 3 pages.
Order Granting Request for Reexamination of U.S. Pat. No. 7,657,629, mailed Jul. 30, 2011, Reexamination Control No. 90/011,766, 10 pages.
Office Action for Reexamination Control No. 90/011,766, mailed on Oct. 4, 2011, 7 pages.
Ex Parte Reexamination Interview Summary for Reexamination Control No. 90/011,766, mailed on Nov. 29, 2011, 57 pages.
Decision on Petition for Extension of Time in Reexamination (Granted), mailed Dec. 2, 2011, Reexamination Control No. 90/011,766, 3 pages.
Final Office Action for Reexamination Control No. 90/011,766, mailed on Jul. 17, 2012, 76 pages.
Request for Inter Partes Reexamination for U.S. Pat. No. 7,657,629 B1, filed Nov. 17, 2011, 238 pages.
Notice of Inter Partes Reexamination Request Filing Date and Notice of Assignment of Inter Partes Reexamination Request, mailed Dec. 5, 2011, Reexamination Control No. 95/001,824, 2 pages.
Order Granting Request for Inter Partes Reexamination of U.S. Pat. No. 7,657,629 and Office Action for Reexamination Control No. 95/001,824, mailed Jan. 12, 2012, 33 pages.
Third Party Requester's Comments under 35 U.S.C. § 314(B)(2) and 37 C.F.R. § 1.947, for Reexamination Control No. 95/001,824, filed Apr. 11, 2012, 21 pages.
Action Closing Prosecution, for Reexamination Control No. 95/001,824, mailed Jul. 17, 2012, 35 pages.
Notice of Allowance for U.S. Appl. No. 11/707,697, mailed on Aug. 5, 2011, 9 pages.
Notice of Allowance for U.S. Appl. No. 11/707,697, mailed Aug. 12, 2011, 6 pages.
Office Communication for U.S. Appl. No. 12/635,371, mailed on Mar. 24, 2011, 29 pages.
Non-Final Office Action for U.S. Appl. No. 12/635,371, mailed on Jun. 8, 2011, 9 pages.
Non-Final Office Action for U.S. Appl. No. 12/635,371, mailed on Feb. 15, 2012, 10 pages.
Final Office Action for U.S. Appl. No. 12/635,371, mailed on Jul. 13, 2012, 10 pages.
Request for Reexamination of U.S. Pat. No. 7,574,508, filed Jun. 27, 2011, 21 pages.
IBM Corp., SecureWay® Network Dispatcher: User's Guide—Version 2.1 for AIX, Solaris, and Windows NT, Third Edition, Chapters 3, 4, 9, 10, 11, and Appendices C & E, Mar. 1999.
Yerxa, G., "ACElerate on Fast Track for Load-Balancing," Mar. 8, 1999, retrieved Nov. 5, 2002, from http://www.networkcomputing.com/1005/1005sp2.html, pp. 1-4.
Bestavros, Azer, "WWW Traffic Reduction and Load Balancing through Server-Based Caching," IEEE Concurrency, Jan.-Mar. 1997, pp. 56-67.
Paul, Arindam et al., "Balancing Web Server Load for Adaptable Video Distribution," IEEE, 2000, pp. 469-476.
AlteonWebSystems, "PCD White Paper," AlteonWebSystems, pp. 1-8, Mar. 2001.
Cardellini, V., et al., "Dynamic Load Balancing on Web-server Systems," IEEE Internet Computing, 3(3):28-39, May-Jun. 1999.
Foundry Networks, Inc., "Server Load Balancing in Today's Web-enabled Enterprises," White Paper, pp. 1-10, Apr. 2002.
Genova, Z., et al., "Challenges in URL Switching for Implementing Globally Distributed Web Sites," IEEE, pp. 89-94, 2000.
Genova, Z., et al., "Challenges in URL Switching for Implementing Globally Distributed Web Sites," Department of Computer Science and Engineering, University of South Florida, pp. 1-9, Aug. 11, 2000.
Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.
Cisco Document, "Configuring the CSS Domain Name Service," posted on Dec. 2000, Cisco Systems Inc., http://www.ciscosystems.com, pp. 1-13.
Doeringer et al., "Routing on Longest-Matching Prefixes," IEEE/ACM Transactions on Networking, vol. 4, No. 1, Feb. 1996, pp. 86-97.
F5 Networks, Inc., "Keeping Up with Multi-Service Applications," A F5 Networks, Inc. White Paper Document, Jan. 2006, 8 pages, Seattle, WA.

(56) References Cited

OTHER PUBLICATIONS

Citrix Systems, Inc., "NetScaler Global Server Load Balancing for Presentation Server and Access Gateway (All Editions) Deployments," Design Consideration NetScaler 8.0, 2007, 16 pages, Fort Lauderdale, FL.

F5 Networks, Inc., "Optimize Application Delivery Across Your Globally Distributed Data Centers," BIG-IP Global Traffic Manager Datasheet, 2009, 8 pages, Seattle WA.

Stalvig P., "Disaster Recovery: Not Just Planning for the Worst," A F5 Networks, Inc. White Paper Document, 2008, 16 pages, F5 Networks, Inc., Seattle, WA.

Cisco Systems, Inc., "The Global Server Load Balancing Primer," A Cisco Systems, Inc. White Paper Document, 1992-2004, 20 pages, San Jose, CA.

Civil Action 10-332, Complaint for Patent Infringement with Exhibits A-G, filed on Apr. 23, 2010, 131 pages.

Civil Action 10-332, Second Amended and Supplemental Complaint for Patent Infringement with Exhibits H-I, filed on Jul. 16, 2010, 41 pages.

Civil Action CV10-03443, Complaint for Declaratory Judgment with Exhibits A-I, filed on Aug. 6, 2010, 153 pages.

Network Working Group, Request for Comments (RFC) 4033, "DNS Security Introduction and Requirements," Mar. 2005, 22 pages.

Network Working Group, Request for Comments (RFC) 4034, "Resource Records for the DNS Security Extensions," Mar. 2005, 31 pages.

Network Working Group, Request for Comments (RFC) 4035, "Protocol Modifications for the DNS Security Extensions," Mar. 2005, 55 pages.

National Institute of Standards and Technology (NIST), "Secure Domain Name System (DNS) Deployment Guide," Special Publication 800-81, May 2006, 103 pages.

CMP Media LLC, "VeriSign DNSSEC Interop Lab Adds Brocade, A10 Networks, BlueCat Networks," Jun. 29, 2010, can be retrieved from http://www.darkreading.com/story/showArticle.jhtml?articleID=225701776, 3 pages.

Meyer, Nathan et al., "F5 and Infoblox DNS Integrated Architecture: Offering a Complete Scalable, Secure DNS Solution," A F5 Networks, Inc. Technical Brief, 2010, 18 pages, Seattle, WA.

Silva, Peter, "DNSSEC: The Antidote to DNS Cache Poisoning and Other DNS Attacks," A F5 Networks, Inc. Technical Brief, 2009, 10 pages, Seattle, WA.

Wikimedia Foundation, Inc., "Domain Name Security Extensions," retrieved Oct. 22, 2010, from http://en.wikipedia.org/wiki/Domain_Name_System_Security_Extensions, 17 pages.

A10 Networks, Inc., "A10 Networks Announces Unique and Wide Ranging Customer-Driven Functionality for AX Series Application Delivery Controllers," News Release, Oct. 18, 2010, from http://www.a10networks.com/news/2010/101018-AX_Series_2.6.php, 2 pages.

Civil Action 10-332, Report on the Filing or Determination of an Action Regarding a Patent or Trademark, filed on Aug. 5, 2010, 2 pages.

Civil Action 10-332, Notice of Voluntary Dismissal Without Prejudice, filed on Aug. 5, 2010, 2 pages.

Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.

Notice of Allowance for U.S. Appl. No. 12/938,232, mailed on Apr. 7, 2011, 51 pages.

Final Office Action for U.S. Appl. No. 11/707,697, mailed on Apr. 20, 2011, 10 pages.

Joshi, U.S. Appl. No. 13/101,398, filed May 5, 2011; 28 pages.

Joshi et al., U.S. Appl. No. 13/229,380, filed Sep. 9, 2011.

Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.

Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Apr. 29, 2011, 42 pages.

Civil Action CV10-03428, Answer to Third Amended Complaint, Affirmative Defenses, and Counterclaims, filed on May 16, 2011, 40 pages.

Civil Action CV10-03428, Answer to Defendant A10 Networks, Inc.'s Counterclaims, and Counterclaim, filed on May 27, 2011, 12 pages.

Delgadillo, K., "Cisco Distributed Director," Cisco White Paper, 1999, 19 pages.

Table of Contents for 2nd Conference on Telecommunications (ConfTele'99), Apr. 15-16, 1999, 9 pages.

Bernardo, L. et al., "Scalability Issues in Telecommunication Services," In Proceedings of 2nd Conference on Telecommunications (ConfTele'99), Apr. 15-16, 1999, pp. 409-413.

Lin, "VPN Tunnel Balancer," U.S. Appl. No. 60/169,502, filed Dec. 7, 1999, 7 pages.

Cisco Systems, Inc., "Cisco LocalDirector Version 1.6.3 Release Notes," Oct. 1997, 52 pages, San Jose, CA.

Foundry Networks, Inc., "Foundry ServerIron Installation and Configuration Guide," May 2000, 784 pages.

Dell Computer Corporation, "3-DNS Reference Guide, Version 4.2," 2002, 261 pages.

Schemers III, "Ibnamed: A Load Balancing Name Server in Perl," 1995 LISA IX, Sep. 17-22, 1995, Monterey, CA, 13 pages.

Goldszmidt, "Load Distribution for Scalable Web Servers: Summer Olympics 1996," In Proceedings of the 8th IFIP/IEEE International Workshop on Distributed Systems: Operations and Management, Sydney, Australia, Oct. 1997, 10 pages.

"Use F5 Networks' 3DNS Controller to Supercharge Standard DNS Capabilities," Jul. 1999, F5 White Paper, Seattle, WA.

Buyya, "High Performance Cluster Computing: Architectures and Systems," vol. 1, copyright 1999, Prentice Hall PTR, Upper Saddle River, New Jersey 07458, http://www.phptr.com.

Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.

Civil Action CV10-03428—Notice of Granted Requests for Reexamination of Patents 7,547,508 and 7,270,977, Filed Aug. 1, 2011, 31 pages, including Exhibits A and B.

Civil Action CV10-03428—Notice of Granted Requests for Reexamination of Patents 7,558,195, 7,657,629, 7,840,678, Filed Aug. 5, 2011, 316 pages.

Civil Action CV10-03428—Notice of Granted Requests for Reexamination of Patent 7,584,301, Filed Aug. 12, 2011, 14 pages, including Exhibit A.

Civil Action CV10-03428—Joint Claim Construction, Filed Aug. 26, 2011, 29 pages.

Civil Action CV10-03428—Notice of Granted Requests for Reexamination of U.S. Pat. Nos. 7,774,833; 7,454,500; 7,899,899; 7,754,965; 7,647,427; and 7,716,370, Filed Sep. 6, 2011, 72 pages, including Exhibits A through F.

Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, Filed Jun. 27, 2011, 779 pages, Including Exhibits A through M.

Skene et al., "Method and System for Balancing Load Distribution on a Wide Area Network," U.S. Appl. No. 09/459,815, filed Dec. 13, 1999, 59 pages.

Skene et al., "Method and System for Name Server Load Balancing," U.S. Appl. No. 60/182,812, filed Feb. 16, 2000, 16 pages.

Tsimelzon et al., "Java application framework for an internet content delivery network," U.S. Appl. No. 60/347,481, filed Jan. 11, 2002, 26 pages.

"Foundry Networks Announces Application Aware Layer 7 Switching on ServerIron Platform," Mar. 1999, 4 pages.

(56) References Cited

OTHER PUBLICATIONS

Civil Action CV10-03428, Order Construing Disputed Claim Terms of U.S. Pat. Nos. 7,647,427; 7,716,370; 7,558,195; 7,454,500; 7,581,009; 7,657,629; 7,584,301; 7,840,678; and 5,875,185, issued Jan. 6, 2012, 33 pages.
Information Disclosure Statement filed on Apr. 4, 2004, for U.S. Pat. No. 7,308,475, 5 pages.
Release Note: 3-DNS Controller, version 4.5, Mar. 5, 2007, 19 pages.
F5 Networks' Newest Wide Area Traffic Management Solution Enables Enterprises to Meet Global e-Business Objectives, Business Wire, Feb. 19, 2002, 4 pages.
Release Note: 3-DNS Controller, version 4.2, Feb. 13, 2002, 23 pages.
Huang et al., "A DNS Reflection Method for Global Traffic Management," Proceedings USENIX Annual Technical Conference (ATC'10), 2010, 7 pages.
Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Civil Action CV10-03428, Transcript of the Deposition of Kevin Delgadillo, taken Mar. 14, 2012, 12 pages.
Delgadillo, K., "Cisco DistributedDirector," posted Apr. 12, 1999, submitted as Exhibit 2 in *Brocade Communications Systems, Inc.* v. *A10 Networks, Inc.*, Civil Action CV10-03428, Mar. 21, 2012, 27 pages.
Delgadillo, K., "Cisco DistributedDirector," 1999, submitted as Exhibit 3 in *Brocade Communications Systems, Inc.* v. *A10 Networks, Inc.*, Civil Action CV10-03428, Mar. 21, 2012, 20 pages.
Declaration of James E. Mrose, entered as Exhibit Q in *Brocade Communications Systems, Inc.* v. *A10 Networks, Inc.*, Civil Action CV10-03428, Mar. 21, 2012, 4 pages.
Information Disclosure Statement, filed Jul. 27, 1999 in the prosecution of U.S. Appl. No. 09/294,837, submitted as Exhibit A to the Mrose Declaration, 7 pages.
Request for Reexamination of U.S. Pat. No. 7,454,500, filed Jun. 27, 2011, 29 pages.
Notice of Rexamination Request Filing Date and Notice of Assignment of Reexamination Request, mailed Jul. 1, 2011, Reexamination Control No. 90/011,772, 2 pages.
Ex Parte Reexamination Interview Summary for Reexamination Control No. 90/011,772, mailed Jul. 21, 2011, 3 pages.
Order Granting Request for Reexamination of U.S. Pat. No. 7,454,500, mailed Aug. 12, 2011, Reexamination Control No. 90/011,772, 11 pages.
Office Action for Reexamination Control No. 90/011,772, mailed Oct. 13, 2011, 8 pages.
Decision on Petition for Extension of Time in Reexamination (Granted), mailed Nov. 17, 2011, Reexamination Control No. 90/011,772, 3 pages.
Ex Parte Reexamination Interview Summary for Reexamination Control No. 90/011,772, mailed on Nov. 29, 2011, 58 pages.
Ex Parte Reexamination Interview Summary for Reexamination Control No. 90/011,772, mailed on Apr. 10, 2012, 3 pages.
Final Office Action for Reexamination Control No. 90/011,772, mailed May 17, 2012, 53 pages.
Ex Parte Reexamination Interview Summary for Reexamination Control No. 90/011,772, mailed on Jun. 29, 2012, 6 pages.
Request for Inter Partes Reexamination of U.S. Pat. No. 7,454,500, filed Nov. 4, 2011, 157 pages.
Notice of Reexamination Request Filing Date and Notice of Assignment of Reexamination Request, mailed Jun. 30, 2011, Reexamination Control No. 90/011,761, 2 pages.
Ex Parte Interview Summary for Reexamination Control No. 90/011,761, mailed Jul. 6, 2011, 3 pages.
Order Granting Request for Reexamination of U.S. Pat. No. 7,756,965, mailed Aug. 19, 2011, Reexamination Control No. 90/011,761, 9 pages.
Office Action for Reexamination Control No. 90/011,761, mailed Nov. 18, 2011, 12 pages.
Decision on Petition for Extension of Time in Reexamination (Granted), mailed Jan. 3, 2012, Reexamination Control No. 90/011,761, 3 pages.
Final Office Action with Interview Summary for Reexamination Control No. 90/011,761, mailed on Mar. 26, 2012, 17 pages.
Advisory Action for Reexamination Control No. 90/011,761, mailed on Jul. 17, 2012, 11 pages.
Request for Inter Partes Reexamination for U.S. Pat. No. 7,756,965 B1, filed Nov. 18, 2011, 189 pages.
Notice of Inter Partes Reexamination Request Filing Date and Notice of Assignment of Inter Partes Reexamination Request, mailed Dec. 1, 2011, Reexamination Control No. 95/001,827, 2 pages.
Order Granting Request for Inter Partes Reexamination of U.S. Pat. Decision on Petition for Extension of Time in Reexamination (Granted), mailed Mar. 30, 2012, Reexamination Control No. 95/001,827, 3 pages.
Third Party Requester's Comments under 35 U.S.C. § 314(B)(2) and 37 C.F.R. § 1.947, for Reexamination Control No. 95/001,827, filed Jun. 13, 2012, 40 pages.
Third Party Requester's Refiling of Certificate of Service for Requester Comments, for Reexamination Control No. 95/001,827, filed Jun. 21, 2012, 3 pages.
Third Party Requester's Opposition to Petition to Refuse Entry of Requester's Comments, for Reexamination Control No. 95/001,827, filed Jul. 12, 2012, 5 pages.
Request for Reexamination of U.S. Pat. No. 7,899,899, filed Jun. 27, 2011, 24 pages.
Notice of Reexamination Request Filing Date and Notice of Assignment of Reexamination Request, mailed Jul. 8, 2011, Reexamination Control No. 90/011,760, 2 pages.
Ex Parte Interview Summary for Reexamination Control No. 90/011,760, mailed Jul. 18, 2011, 3 pages.
Order Granting Request for Reexamination of U.S. Pat. No. 7,899,899, mailed Aug. 19, 2011, Reexamination Control No. 90/011,760, 9 pages.
Office Action for Reexamination Control No. 90/011,760, mailed Nov. 18, 2011, 8 pages.
Decision on Petition for Extension of Time in Reexamination (Granted), mailed Jan. 5, 2012, Reexamination Control No. 90/011,760, 3 pages.
Final Office Action and Interview Summary for Reexamination Control No. 90/011,760, mailed Mar. 21, 2012, 14 pages.
Advisory Action for Reexamination Control No. 90/011,760, mailed Jul. 17, 2012, 10 pages.
Request for Inter Partes Reexamination for U.S. Pat. No. 7,899,899 B1, filed Nov. 18, 2011, 153 pages.
Notice of Inter Partes Reexamination Request Filing Date and Notice of Assignment of Inter Partes Reexamination Request, mailed Nov. 29, 2011, Reexamination Control No. 95/001,826, 2 pages.
Order Granting Request for Inter Partes Reexamination of U.S. Pat. No. 7,899,899 and Office Action for Reexamination Control No. 95/001,826, mailed Feb. 7, 2012, 19 pages.
Decision on Petition for Extension of Time in Reexamination (Granted), mailed Apr. 4, 2012, Reexamination Control No. 95/001,826, 3 pages.
Third Party Requester's Comments under 35 U.S.C. § 314(B)(2) and 37 C.F.R. § 1.947, for Reexamination Control No. 95/001,826, filed Jun. 6, 2012, 46 pages.
Third Party Requester's Refiling of Certificate of Service for Requester Comments, for Reexamination Control No. 95/001,826, filed Jun. 21, 2012, 3 pages.
Third Party Requester's Opposition to Petition to Refuse Entry of Requester's Comments, for Reexamination Control No. 95/001,826, filed Jul. 12, 2012, 5 pages.
Non-Final Office Action for U.S. Appl. No. 13/023,292, mailed Jul. 8, 2011, 6 pages.
Notice of Allowance for U.S. Appl. No. 13/023,292, mailed Feb. 13, 2012, 85 pages.
Office Communication for U.S. Appl. No. 13/023,292, mailed Feb. 23, 2012, 11 pages.
Notice of Allowance for U.S. Appl. No. 13/023,292, mailed May 18, 2012, 25 pages.

(56) References Cited

OTHER PUBLICATIONS

Notice of Allowance for U.S. Appl. No. 13/023,292, mailed Jun. 4, 2012, 22 pages.
Office Communication for U.S. Appl. No. 13/023,292, mailed Jul. 2, 2012, 7 pages.
Joshi, U.S. Appl. No. 12/938,232, filed Nov. 2, 2010; 28 pages.
Joshi, U.S. Appl. No. 13/008,321, filed Jan. 18, 2011; 36 pages.
Joshi, U.S. Appl. No. 13/023,292, filed Feb. 8, 2011; 30 pages.
Non-Final Office Action for U.S. Appl. No. 09/670,487, Mailed Dec. 31, 2003, 22 pages.
Final Office Action for U.S. Appl. No. 09/670,487, Mailed Sep. 21, 2004, 22 pages.
Non-Final Office Action for U.S. Appl. No. 09/670,487, Mailed Mar. 15, 2005, 18 pages.
Final Office Action for U.S. Appl. No. 09/670,487, Mailed Nov. 3, 2005, 17 pages.
Non-Final Office Action for U.S. Appl. No. 09/670,487, Mailed May 3, 2006, 18 pages.
Non-Final Office Action for U.S. Appl. No. 09/670,487, Mailed Nov. 17, 2006, 8 pages.
Final Office Action for U.S. Appl. No. 09/670,487, Mailed Oct. 30, 2007, 9 pages.
Non-Final Office Action for U.S. Appl. No. 09/670,487, Mailed Jul. 22, 2008, 6 pages.
Notice of Allowance for U.S. Appl. No. 09/670,487, Mailed Sep. 18, 2008, 4 pages.
Non-Final Office Action for U.S. Appl. No. 11/741,480, Mailed Nov. 27, 2007, 5 pages.
Non-Final Office Action for U.S. Appl. No. 11/741,480, Mailed Apr. 29, 2008, 6 pages.
Final Office Action for U.S. Appl. No. 11/741,480, Mailed Oct. 31, 2008, 10 pages.
Notice of Allowance for U.S. Appl. No. 11/741,480, Mailed Apr. 10, 2009, 7 pages.
Non-Final Office Action for U.S. Appl. No. 12/496,560, mailed on Sep. 17, 2010, 27 pages.
Final Office Action for U.S. Appl. No. 12/496,560, mailed on Jan. 28, 2011, 10 pages.
Non-Final Office Action for U.S. Appl. No. 12/272,618, mailed on Sep. 29, 2009, 16 pages.
Non-Final Office Action for U.S. Appl. No. 12/272,618, mailed on Feb. 4, 2010, 14 pages.
Final Office Action for U.S. Appl. No. 12/272,618, mailed on Nov. 26, 2010, 19 pages.
Non-Final Office Action for U.S. Appl. No. 10/211,822, Mailed Aug. 19, 2005, 16 pages.
Notice of Allowance for U.S. Appl. No. 10/211,822, Mailed Mar. 7, 2006, 10 pages.
Non-Final Office Action for U.S. Appl. No. 10/377,364, mailed on Sep. 22, 2006, 18 pages.
Non-Final Office Action for U.S. Appl. No. 10/377,364, mailed on Mar. 26, 2007, 14 pages.
Non-Final Office Action for U.S. Appl. No. 10/377,364, mailed on Sep. 4, 2007, 13 pages.
Final Office Action for U.S. Appl. No. 10/377,364, mailed on Apr. 9, 2008, 15 pages.
Non-Final Office Action for U.S. Appl. No. 10/377,364, mailed on Nov. 24, 2008, 19 pages.
Final Office Action for U.S. Appl. No. 10/377,364, mailed on Aug. 31, 2009, 25 pages.
Advisory Action for U.S. Appl. No. 10/377,364, mailed on Nov. 23, 2009, 3 pages.
Notice of Allowance for U.S. Appl. No. 10/377,364, mailed on Jan. 12, 2010, 5 pages.
Non-Final Office Action for U.S. Appl. No. 10/206,580, Mailed Aug. 15, 2005, 14 pages.
Final Office Action for U.S. Appl. No. 10/206,580, Mailed Mar. 9, 2006, 12 pages.
Advisory Action for U.S. Appl. No. 10/206,580, Mailed Jun. 6, 2006, 3 pages.
Non-Final Office Action for U.S. Appl. No. 10/206,580, Mailed Jul. 12, 2006, 8 pages.
Notice of Allowance for U.S. Appl. No. 10/206,580, Mailed Jan. 11, 2007, 17 pages.
Notice of Allowance for U.S. Appl. No. 10/206,580, Mailed Jul. 6, 2007, 5 pages.
Non-Final Office Action for U.S. Appl. No. 10/376,903, mailed on Jul. 17, 2006, 7 pages.
Final Office Action for U.S. Appl. No. 10/376,903, mailed on Jan. 12, 2007, 8 pages.
Non-Final Office Action for U.S. Appl. No. 10/376,903, mailed on Jun. 5, 2007, 13 pages.
Non-Final Office Action for U.S. Appl. No. 10/376,903, mailed on Feb. 20, 2008, 10 pages.
Final Office Action for U.S. Appl. No. 10/376,903, mailed on Oct. 16, 2008, 9 pages.
Non-Final Office Action for U.S. Appl. No. 10/376,903, mailed on Mar. 4, 2009, 8 pages.
Notice of Allowance for U.S. Appl. No. 10/376,903, mailed on Oct. 19, 2009, 4 pages.
Non-Final Office Action for U.S. Appl. No. 11/707,697, Mailed Mar. 3, 2009, 41 pages.
Requirement for Restriction/Election for U.S. Appl. No. 11/707,697, mailed on Sep. 17, 2009, 6 pages.
Final Office Action for U.S. Appl. No. 11/707,697, mailed on Jan. 12, 2010, 22 pages.
Office Action for U.S. Appl. No. 11/707,697, mailed on Nov. 22, 2010, 24 pages.
Non-Final Office Action for U.S. Appl. No. 12/635,371, mailed on Oct. 7, 2010, 44 pages.
Final Office Action for U.S. Appl. No. 12/635,371, mailed on Mar. 16, 2011, 7 pages.
Notice of Reexamination Request Filing Date and Notice of Assignment of Reexamination Request, mailed Jun. 29, 2011, Reexamination Control No. 90/011,764, 2 pages.
Ex Parte Interview Summary for Reexamination Control No. 90/011,764, Jul. 21, 2011, 3 pages.
Order Granting Request for Reexamination of U.S. Pat. No. 7,574,508, mailed Jul. 22, 2011, Reexamination Control No. 90/011,764, 15 pages.
Office Action for Reexamination Control No. 90/011,764, mailed on Nov. 14, 2011, 18 pages.
Office Action for Reexamination Control No. 90/011,764, mailed on Nov. 18, 2011, 18 pages.
Decision on Petition for Extension of Time in Reexamination (Granted), mailed Jan. 3, 2012, Reexamination Control No. 90/011,764, 3 pages.
Ex Parte Reexamination Interview Summary for Reexamination Control No. 90/011,764, mailed on Jan. 6, 2012, 52 pages.
Notice of Intent to Issue Ex Parte Reexamination Certificate for Reexamination Control No. 90/011,764, mailed on Jun. 21, 2012, 56 pages.
Request for Inter Partes Reexamination of U.S. Pat. No. 7,574,508, filed Nov. 4, 2011, 70 pages.
Notice of Inter Partes Reexamination Request Filing Date and Notice of Assignment of Inter Partes Reexamination Request, mailed Nov. 8, 2011, Reexamination Control No. 95/001,804, 2 pages.
Order Granting Request for Inter Partes Reexamination of U.S. Pat. No. 7,574,508 and Office Action for Reexamination Control No. 95/001,804, mailed Dec. 8, 2011, 20 pages.
Third Party Requester's Comments under 35 U.S.C. § 314(B)(2) and 37 C.F.R. § 1.947, with Exhibits A-E, for Reexamination Control No. 95/001,804, filed Mar. 9, 2012, 79 pages.
Action Closing Prosecution for Reexamination Control No. 95/001,804, mailed Jun. 21, 2012, 74 pages.
Non-Final Office Action for U.S. Appl. No. 12/506,137, mailed on Nov. 23, 2011, 63 pages.
Final Office Action for U.S. Appl. No. 12/506,137, mailed on Jul. 20, 2012, 46 pages.
Decision on Appeal for U.S. Appl. No. 10/305,823, mailed on Jul. 11, 2011, 10 pages.
Decision on Request for Rehearing for U.S. Appl. No. 10/305,823, mailed on Nov. 1, 2011, 5 pages.

(56) References Cited

OTHER PUBLICATIONS

Request for Reexamination of U.S. Pat. No. 7,584,301, filed Jun. 27, 2011, 36 pages.
Notice of Reexamination Request Filing Date and Notice of Assignment of Reexamination Request, mailed Jul. 6, 2011, Reexamination Control No. 90/011,765, 2 pages.
Ex Parte Interview Summary for Reexamination Control No. 90/011,765, Jul. 6, 2011, 3 pages.
Order Granting Request for Reexamination of U.S. Pat. No. 7,584,301, mailed Aug. 8, 2011, Reexamination Control No. 90/011,765, 10 pages.
Office Action in Ex Parte Reexamination for Control No. 90/011,765, mailed on Oct. 13, 2011, 7 pages.
Ex Parte Reexamination Interview Summary for Reexamination Control No. 90/011,765, mailed on Nov. 29, 2011, 57 pages.
Decision on Petition for Extension of Time in Reexamination (Granted), mailed Dec. 9, 2011, Reexamination Control No. 90/011,765, 3 pages.
Final Office Action for Reexamination Control No. 90/011,765, mailed May 16, 2012, 59 pages.
Advisory Action for Reexamination Control No. 90/011,765, mailed Jul. 20, 2012, 12 pages.
Request for Inter Partes Reexamination of U.S. Pat. No. 7,584,301, filed Nov. 8, 2011, 194 pages.
Notice of Inter Partes Reexamination Request Filing Date and Notice of Assignment of Inter Partes Reexamination Request, mailed Nov. 21, 2011, Reexamination Control No. 95/001,812, 2 pages.
Order Granting Request for Inter Partes Reexamination of U.S. Pat. No. 7,584,301 and Office Action for Reexamination Control No. 95/001,812, mailed Dec. 28, 2011, 25 pages.
Third Party Requester's Comments under 35 U.S.C. § 314(B)(2) and 37 C.F.R. § 1.947, for Reexamination Control No. 95/001,812, filed Mar. 29, 2012, 33 pages.
Action Closing Prosecution, for Reexamination Control No. 95/001,812, mailed Jun. 2, 2012, 49 pages.
Third Party Requester's Refiling of Certificate of Service for Requester Comments, for Reexamination Control No. 95/001,812 filed Jun. 21, 2012, 3 pages.
Request for Reexamination of U.S. Pat. No. 7,840,678, filed Jun. 27, 2011, 25 pages.
Notice of Reexamination Request Filing Date and Notice of Assignment of Reexamination Request, mailed Jul. 1, 2011, Reexamination Control No. 90/011,763, 2 pages.
Ex Parte Interview Summary for Reexamination Control No. 90/011,763, mailed Jul. 5, 2011, 3 pages.
Order Granting Request for Reexamination of U.S. Pat. No. 7,840,678, mailed Jul. 29, 2011, Reexamination Control No. 90/011,763, 10 pages.
Office Action for Reexamination Control No. 90/011,763, mailed Oct. 4, 2011, 7 pages.
Decision on Petition for Extension of Time in Reexamination (Granted), mailed Nov. 17, 2011, Reexamination Control No. 90/011,763, 3 pages.
Ex Parte Reexamination Interview Summary for Reexamination Control No. 90/011,763, mailed on Nov. 29, 2011, 57 pages.
Final Office Action for Reexamination Control No. 90/011,763, mailed on Apr. 25, 2012, 51 pages.
Advisory Action for Reexamination Control No. 90/011,763, mailed on Jul. 13, 2012, 14 pages.
Request for Inter Partes Reexamination for U.S. Pat. No. 7,840,678, mailed on Nov. 17, 2011, 164 pages.
Notice of Inter Partes Reexamination Request Filing Date and Notice of Assignment of Inter Partes Reexamination Request, mailed Nov. 23, 2011, Reexamination Control No. 95/001,822, 2 pages.
Order Granting Request for Inter Partes Reexamination of U.S. Pat. No. 7,840,678 and Office Action for Reexamination Control No. 95/001,822, mailed Jan. 12, 2012, 21 pages.
Third Party Requester's Comments under 35 U.S.C. § 314(B)(2) and 37 C.F.R. § 1.947, for Reexamination Control No. 95/001,822, filed Apr. 11, 2012, 37 pages.
Action Closing Prosecution, for Reexamination Control No. 95/001,822, mailed May 5, 2012, 45 pages.
Third Party Requester's Comments under 35 U.S.C. § 314(B)(2) and 37 C.F.R. § 1.947, for Reexamination Control No. 95/001,822, filed Jul. 5, 2012, 27 pages.
Non-Final Office Action for U.S. Appl. No. 13/101,398, mailed on Nov. 10, 2011, 58 pages.
Final Office Action for U.S. Appl. No. 13/101,398, mailed on Jun. 11, 2012, 56 pages.
Request for Reexamination of U.S. Pat. No. 7,756,965, filed Jun. 27, 2011, 38 pages.
Non-Final Office Action for U.S. Appl. No. 10/214,921, mailed on Feb. 7, 2006, 7 pages.
Final Office Action for U.S. Appl. No. 10/214,921, mailed on Aug. 9, 2006, pp. 10 pages.
Advisory Action for U.S. Appl. No. 10/214,921, mailed on Sep. 21, 2006, 3 pages.
Non-Final Office Action for U.S. Appl. No. 10/214,921, mailed on Dec. 7, 2006, 11 pages.
Final Office Action for U.S. Appl. No. 10/214,921, mailed on Aug. 13, 2007, 20 pages.
Non-Final Office Action for U.S. Appl. No. 10/214,921, mailed on Nov. 15, 2007, 23 pages.
Final Office Action for U.S. Appl. No. 10/214,921, mailed on Jun. 12, 2008, 21 pages.
Non-Final Office Action for U.S. Appl. No. 10/214,921, mailed on Oct. 6, 2008, 34 pages.
Notice of Allowance for U.S. Appl. No. 10/214,921, mailed on Apr. 3, 2009, 10 pages.
Non-Final Office Action for U.S. Appl. No. 12/506,137, mailed on Oct. 7, 2010, 26 pages.
Non-Final Office Action for U.S. Appl. No. 10/305,823, Mailed Jan. 12, 2006, 16 pages.
Final Office Action for U.S. Appl. No. 10/305,823, mailed on Jul. 3, 2006, 13 pages.
Non-Final Office Action for U.S. Appl. No. 10/305,823, mailed on Jan. 3, 2007, 13 pages.
Non-Final Office Action for U.S. Appl. No. 10/305,823, mailed on Sep. 10, 2007, 17 pages.
Final Office Action for U.S. Appl. No. 10/305,823, mailed on Mar. 24, 2008, 18 pages.
Advisory Action for U.S. Appl. No. 10/305,823, mailed on Jul. 9, 2008, 4 pages.
Examiner's Response to Appeal Brief for U.S. Appl. No. 10/305,823, mailed on Mar. 4, 2009, 26 pages.
Office Communication Regarding Prior Art Relied Upon in the Rejection of Claims Under Appeal, for U.S. Appl. No. 10/305,823, mailed on Apr. 13, 2009 2 pages.
Non-Final Office Action for U.S. Appl. No. 10/674,627, mailed on Jun. 5, 2006, 11 pages.
Final Office Action for U.S. Appl. No. 10/674,627, mailed on Nov. 3, 2006, 16 pages.
Non-Final Office Action for U.S. Appl. No. 10/674,627, mailed on Jul. 30, 2007, 9 pages.
Final Office Action for U.S. Appl. No. 10/674,627, mailed on Apr. 11, 2008, 17 pages.
Non-Final Office Action for U.S. Appl. No. 10/674,627, mailed on Dec. 23, 2008, 18 pages.
Final Office Action for U.S. Appl. No. 10/674,627, mailed on Aug. 3, 2009, 17 pages.
Advisory Action for U.S. Appl. No. 10/674,627, mailed on Oct. 16, 2009, 3 pages.
Notice of Allowance for U.S. Appl. No. 10/674,627, mailed on Aug. 19, 2010, 4 pages.
Notice of Allowance for U.S. Appl. No. 10/839,919, mailed on Mar. 5, 2008, 17 pages.
Non-Final Office Action for U.S. Appl. No. 10/839,919, mailed on Jun. 18, 2008, 15 pages.
Final Office Action for U.S. Appl. No. 10/839,919, mailed on Dec. 9, 2008, 22 pages.
Notice of Allowance for U.S. Appl. No. 10/839,919, mailed on May 14, 2009, 19 pages.

(56) References Cited

OTHER PUBLICATIONS

Notice of Allowance for U.S. Appl. No. 12/506,130, mailed on Oct. 12, 2010, 49 pages.
Non-Final Office Action for U.S. Appl. No. 10/840,496, mailed on Oct. 18, 2007, 23 pages.
Notice of Allowance for U.S. Appl. No. 12/177,021, mailed Dec. 10, 2010, 20 pages.
Final Office Action for U.S. Appl. No. 10/840,496, mailed on Aug. 1, 2008, 14 pages.
Notice of Allowance for U.S. Appl. No. 10/840,496, mailed on Oct. 15, 2008, 6 pages.
Non-Final Office Action for U.S. Appl. No. 12/353,701, mailed on Nov. 4, 2009, 22 pages.
Notice of Allowance for U.S. Appl. No. 12/353,701, mailed on Apr. 9, 2010, 15 pages.
Notice of Allowance for U.S. Appl. No. 12/787,779, mailed Dec. 20, 2010, 45 pages.
Notice of Allowance for U.S. Appl. No. 12/787,779, mailed Jan. 12, 2011, 48 pages.
Non-Final Office Action for U.S. Appl. No. 10/924,552, Mailed Feb. 27, 2008, 14 pages.
Notice of Allowance for U.S. Appl. No. 10/924,552, Mailed May 30, 2008, 18 pages.
Non-Final Office Action for U.S. Appl. No. 12/177,021, mailed Jan. 29, 2010, 8 pages.
Final Office Action for U.S. Appl. No. 12/177,021, mailed Aug. 12, 2010, 20 pages.
IBM Corp., IBM WebSphere Performance Pack: Load Balancing with IBM SecureWay Network Dispatcher, First Edition, Chapters 1, 2, 4, and 8, Oct. 1999.
Albitz, P., et al., "DNS and BIND in a Nutshell," O'Reilly & Associates, Sebastopol, CA, 1992, pp. 214-215.
Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.
Alteon WebSystems, Inc., "Enhancing Web User Experience with Global Server Load Balancing," Jun. 1999, 8 pages.
Krapf, E., "Alteon's Global Server Load Balancing," Business Communications Review, Jan. 1999, p. 60, retrieved Oct. 25, 2002, from http://www.bcr.com/bcrmag/1999/01/p60.asp, 3 pages.
Nortel Networks, "Alteon Personal Content Director," © 2001, can be retrieved from http://www.nortelnetworks.com/personalinternet, 4 pages.
Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.
Civil Action 10-332—*Brocade Communication Systems, Inc. v. A10 Networks, Inc.*—Civil Cover Sheet, filed on Apr. 23, 2010, 1 page.
Civil Action—Case No. CV10-03443—Complaint for Declaratory Judgment, filed on Aug. 6, 2010, with Exhibits A through I, 153 pages.
Civil Action—Case No. CV10-03443—Notice of Voluntary Dismissal Without Prejudice, filed on Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.
Civil Action CV10-03428—Defendant, David Cheung's Answer to Plaintiffs First Amended Complaint, filed Nov. 11, 2010, 32 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations, filed by Brocade Communications Systems, Inc., Foundry Networks, LLC, filed Jul. 15, 2011, 20 pages. Included: Proposed Order.
Civil Action CV10-03428—Declaration of Siddhartha M. Venkatesan in Support of Opposition/Response to Motion, Plaintiffs' Opposition to Defendants' Motion to Stay Proceedings, filed by Brocade Communications Systems, Inc., Foundry Networks, LLC, filed Jul. 15, 2011, 70 pages. Included: Exhibits A through E.
Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included: Declaration of Scott R. Mosko, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 26, 2011, 34 pages. Included: Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted Version] of Andrew (Andy) Guerrero ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and

(56) References Cited

OTHER PUBLICATIONS

Preliminary Injunction filed by Brocade Communications Systems, Inc., Foundry Networks, LLC, filed Jul. 26, 2011, 3 pages.
Civil Action CV10-03428—Declaration of Robert D. Young in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 46 pages. Included: Redacted Exhibits 1 through 8.
Civil Action CV10-03428—Declaration of Lisa McGill in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 506 pages. Included: Exhibits 1 through 30. (due to size, this references will be submitted in three parts).
Civil Action CV10-03428—Plaintiffs' Reply Memorandum in Further Support of Motion for Temporary Restraining Order and Preliminary Injunction[Redacted Version] filed by Brocade Communications Systems, Inc., Foundry Networks, LLC, filed Aug. 4, 2011, 22 pages.
Civil Action CV10-03428—Notice of Errata re Reply Memorandum in Further Support of Motion for Temporary Restraining Order and Preliminary Injunction, filed by Brocade Communications Systems, Inc., Foundry Networks, LLC, filed Aug. 5, 2011, 2 pages.
Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.
Civil Action CV10-03428—Order Denying Motion for Temporary Restraining Order [Redacted Version] of Plaintiffs' Memorandum in Support of Motion for Temporary Restraining Order and Preliminary Injunction, filed by Brocade Communications Systems, Inc., Foundry Networks, LLC, filed Aug. 16, 2011, 5 pages.
Civil Action CV10-03428—Notice of Granted Request for Reexamination of U.S. Pat. No. 7,581,009, filed Sep. 27, 2011, 18 pages.
Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.
Civil Action CV10-03428—Redacted Declaration of Dr. Chi Zhang in Support of Opposition to Plaintiffs' Motion for Temporary Restraining Order and Preliminary Injunction, filed by A10 Networks, Inc., filed Sep. 28, 2011, 4 pages.
Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.
Civil Action CV10-03428—Declaration of Teri H.P. Nguyen in Support of Motion for Partial Summary Judgment Notice of Motion and Motion for Partial Summary Judgment on Assignor Estoppel, filed by Brocade Communications Systems, Inc., Foundry Networks, LLC, filed Oct. 11, 2011, 259 pages. Included: Exhibits A through R.
Civil Action CV10-03428—Initial Claim Construction Brief, filed by Brocade Communications Systems, Inc., Foundry Networks, LLC, filed Oct. 11, 2011, 31 pages.
Civil Action CV10-03428—Declaration of Nitin Gambhir of Brocade Communications Systems, Inc. and Foundry Networks, LLC's Motion for Summary Judgment of Infringement of U.S. Pat. Nos. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.
Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.
Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.
Civil Action CV10-03428—Declaration of Nitin Gambhir in Support of Brocade Communications, Inc. and Foundry Networks, LLCs Motion for Summary Judgment of Infringement of U.S. Pat. Nos. 7,454,500; 7,581,009; 7,657,629; 7,584,301; and 7,840,678, filed by Brocade Communications Systems, Inc., Foundry Networks, LLC, filed Oct. 21, 2011, 162 pages.
Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel, filed by A10 Networks, Inc., Lee Chen, Rajkumar Jalan, Ron Szeto, filed Nov. 8, 2011, 17 pages.
Civil Action CV10-03428—Responsive Claim-Construction Brief (PLR 4-5(b)) by A10 Networks, Inc., Lee Chen, Rajkumar Jalan, filed Nov. 15, 2011, 28 pages.
Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Rajkumar Jalan, filed Nov. 15, 2011, 70 pages. Included: Exhibits A through F.
Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.
Civil Action CV10-03428—Opposition re Motion for Summary Judgment of Noninfringement of U.S. Pat. No. 5,875,185; Motion for Partial Summary Judgment of U.S. Pat. Nos. 7,454,500; 7,581,009; 7,657,629; 7,584,301; and 7,840,678, filed by A10 Networks, Inc., Lee Chen, Rajkumar Jalan, filed Nov. 15, 2011, 20 pages.
Civil Action CV10-03428—Declaration of Scott R. Mosko in Support of Defendant and Counterclaimant A10 Networks, Inc.s, and Defendants Lee Chens and Rajkumar Jalans Opposition to Plaintiffs Brocade Communications, Inc. and Foundry Networks, LLCs Motion for Partial Summary Judgment of U.S. Pat. Nos. 7,454,500; 7,581,009; 7,657,629; 7,584,301; and 7,840,678 filed by A10 Networks, Inc., Lee Chen, Rajkumar Jalan, filed Nov. 15, 2011, 16 pages.
Civil Action CV10-03428—Administrative Motion to Consider Whether Cases Should be Related, filed by Brocade Communications Systems, Inc., Foundry Networks, LLC, filed Nov. 21, 2011, 8 pages. Included: Declaration and Proposed Order.
Civil Action CV10-03428—Reply Claim Construction Brief filed by Brocade Communications Systems, Inc., Foundry Networks, LLC, filed Nov. 22, 2011, 22 pages.
Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages. Included: Exhibit A.
Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.
Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by

(56) References Cited

OTHER PUBLICATIONS

Plaintiffs) filed byA10 Networks, Inc., Lee Chen, Steve Hwang, Rajkumar Jalan, Ron Szeto, filed Nov. 23, 2011, 25 pages. Included: Exhibits 1 through 6.

Civil Action CV10-03428—Litigation Docket, printed on Nov. 26, 2011, 44 pages.

Civil Action CV10-03428—Stipulation Regarding Plaintiffs' Motion for Partial Summary Judgment of Assignor Estoppel, filed Nov. 30, 2011, 2 pages.

Civil Action CV10-03428—Brocade's Opposition to Defendant's Motion to Stay Proceedings Pending Reexaminations, filed Dec. 7, 2011, 18 pages.

Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.

Civil Action CV10-03428—Defendant and Counterclaimant A10 Networks, Inc.'s Notice of Granted Requests for Inter Partes Reexamination of Plaintiffs' U.S. Pat. Nos. 7,558,195; 7,454,500; 7,574,508; and 7,720,977, filed Dec. 28, 2011, 3 pages.

Civil Action CV10-03428—Defendant and Counterclaimant A10 Networks, Inc.'s Notice of Granted Request for Inter Partes Reexamination of Plaintiffs' U.S. Pat. No. 7,581,301, filed Dec. 29, 2011, 3 pages.

Civil Action CV10-03428—Defendant and Counterclaimant A10 Networks, Inc.'s Notice of Granted Request for Inter Partes Reexamination of Plaintiffs' U.S. Pat. Nos. 7,657,629 and 7,840,678, filed Jan. 20, 2012, 3 pages.

Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Pat. Nos. 7,774,833; 7,647,427; 7,716,370; 7,581,009); and (ii) Status Updated for Eleven Already-Instituted Reexaminations (U.S. Pat. Nos. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 3 pages.

Civil Action CV10-03428—Defendant and Counterclaimant A10 Networks, Inc.'s Notice of Granted Request for Inter Partes Reexamination of Plaintiffs' U.S. Pat. No. 7,756,965 and Status Update, filed Feb. 16, 2012, 3 pages.

Civil Action CV10-03428—Defendant and Counterclaimant A10 Networks, Inc.'s Notice of Requests for Reexaminations Granted re U.S. Pat. Nos. 7,558,195; 7,657,629; and 7,840,678, filed Aug. 5, 2011, 3 pages.

Civil Action CV10-03428—Defendant and Counterclaimant A10 Networks, Inc.'s Notice of Granted Requests for Reexamination of U.S. Pat. No. 7,584,301, filed Aug. 12, 2011, 3 pages.

Civil Action CV10-03428—Defendant and Counterclaimant A10 Networks, Inc.'s Motion for Summary Judgment of Noninfringement of U.S. Pat. Nos. 7,647,427 and 7,716,370, filed Oct. 11, 2011, 14 pages.

Civil Action CV10-03428—Declaration of John Chiong in Support of Defendant and Counterclaim—Plaintiff A10 Networks, Inc.'s and Defendants Lee Chen's and Rajkumar Jalan's Motion for Summary Judgment of Noninfringement of U.S. Pat. Nos. 7,647,427 and 7,716,370, filed Oct. 11, 2011, 3 pages.

Civil Action CV10-03428—Declaration of Scott A. Herbst in Support of Defendant and Counterclaim-Plaintiff A10 Networks, Inc.'s and Defendants Lee Chen's and Rajkumar Jalan's Motion for Summary Judgment of Noninfringement of U.S. Pat. Nos. 7,647,427 and 7,716,370, filed Oct. 11, 2011, 3 pages.

Civil Action CV10-03428—Declaration of Nitin Gambhir in Support of Brocade Communications Systems, Inc.'s and Foundry Networks, LLC's (1) Motion for Partial Summary Judgment of Infringement of U.S. Pat. Nos. 7,647,427 and 7,716,370 [Filed Under Seal]; (2) Opposition to Defendants' Motion for Summary Judgment of Non-Infringement of U.S. Pat. Nos. 7,647,427 and 7,716,370 [Filed Under Seal]; and (3) Opposition to Defendants' Motion for Summary Judgment of Non-Infringement of U.S. Pat. No. 7,558,195 [Filed Under Seal], filed Nov. 8, 2011, 153 pages.

Civil Action CV10-03428—Defendant and Counterclaimant A10 Networks, Inc.'s Reply in Support of Motion for Summary Judgment of U.S. Pat. Nos. 7,647,427 and 7,716,370, filed Nov. 22, 2011, 17 pages.

Civil Action CV10-03428—Declaration of Siddhartha M. Venkatesan in Support of Opposition to Motion to Stay Proceedings Pending Reexaminations, filed Dec. 7, 2011, 3 pages.

Civil Action CV10-03428—Declaration of Azer Bestavros in Support of Brocade's Claim Construction Brief, filed Oct. 20, 2011, 24 pages.

Civil Action CV10-03428—Declaration of Izhak Rubin in Support of Brocade Communications Systems, Inc.'s and Foundry Networks, LLC's: (1) Claim Construction Brief; (2) Opposition to Defendants' Motion for Summary Judgment of Non-Infringement of U.S. Pat. Nos. 7,647,427 and 7,716,370; and (3) Opposition to Defendants' Motion for Summary Judgment of Non-Infringement of U.S. Pat. No. 7,558,195, filed Nov. 18, 2011, 34 pages.

Civil Action CV10-03428—Order by Judge Lucy H. Koh Denying A10's Motion for Summary Judgment of NonInfringement; Granting Brocade's Motion for Summary Judgment of NonInfringement, issued Jan. 6, 2012, 20 pages.

Civil Action CV10-03428—A10 Networks, Inc.'s Motion for Leave to File "Notice of Activity Before the Patent Office from the Ongoing Inter Partes and Ex parte Reexaminations of the Asserted Brocade Patents" and Proposed Order, filed Mar. 12, 2012, 10 pages.

Civil Action CV10-03428—Declaration of Scott A. Herbst in Support of A10 Networks, Inc.'s Administrative Motion for Leave to File Notice of Activity Before the Patent Office from the Ongoing Inter Partes and Ex Parte Reexaminations of the Asserted Brocade Patents and Proposed Order, filed Apr. 12, 2012, 70 pages.

Civil Action CV10-03428—Order by Hon. Lucy H. Koh granting Motion for Leave to File "Notice of Acticity Before the Patent Office From the Ongoing Inter Partes and Ex Parte Reexaminations of the Asserted Brocade Patents," issued Mar. 15, 2012, 5 pages.

Civil Action CV10-03428—Declaration of Scott R. Mosko in Support of Defendants A10 Networks, Inc.'s, Lee Chen's, Rajkumar Jalan's, Ron Szeto's and Steve Hwang's Motion for Summary Judgment, filed Apr. 13, 2012, 223 pages.

Civil Action CV10-03428—Declaration of Teri H.P. Nguyen in Support of Plaintiffs' Motion for Partial Summary Judgment Dismissing Invalidity Declaratory Relief Counterclaim and Invalidity Affirmative Defense Regarding U.S. Pat. Nos. 7,454,500; 7,581,009; 7,55,195; and 7,774,833, filed May 3, 2012, 23 pages.

Civil Action CV10-03428—Exhibit 17 to Declaration of Scott R. Mosko in Support of Defendants A10 Networks, Inc.'s, Lee Chen's, Rajkumar Jalan's, Ron Szeto's and Steve Hwang's Motion for Summary Judgment, filed May 4, 2012, 25 pages.

Civil Action CV10-03428—Amended Declaration of Scott R. Mosko in Support of Defendants A10 Networks, Inc.'s, Lee Chen's, Rajkumar Jalan's, Ron Szeto's and Steve Hwang's Motion for Summary Judgment, filed May 7, 2012, 5 pages.

Civil Action CV10-03428—Defendant and Counterclaimant A10 Networks, Inc.'s Notice of Activity in the Ongoing inter partes and ex parte Reexaminations of the Asserted Brocade Patents, filed May 11, 2012, 5 pages.

Civil Action CV10-03428—Plaintiff's Objections to Declarations Submitted by A10 Networks, Inc., Lee Chen, Rajkumar Jalan, Ron Szeto and Steve Hwang in Support of Their Motion for Partial Summary Judgment, filed May 17, 2012, 3 pages.

Civil Action CV10-03428—Declaration of Elizabeth C. McBride in Support of Plaintiffs Brocade Communications Systems, Inc.'s and Foundry Networks, LLC's Opposition to Defendants' Motion for Summary Judgment, filed May 17, 2012, 135 pages.

Civil Action CV10-03428—Declaration of Gary Hemminger in Support of Brocade Communications Systems, Inc.'s and Foundry Networks, LLC's Opposition to Defendants A10 Networks, Inc.'s, Lee Chen's, Rajkumar Jalan's, Ron Szeto's and Steve Hwang's Motion for Summary Judgment, filed May 17, 2012, 3 pages.

Civil Action CV10-03428—Defendants A10 Networks, Inc.'s, Lee Chen's, Rajkumar Jalan's, Ron Szeto's and Steve Hwang's Opposition to Plaintiff's Motion for Partial Summary Judgment Dismissing

(56) References Cited

OTHER PUBLICATIONS

Invalidity Declaratory Relief Counterclaim and Invalidity Defense Regarding U.S. Pat. Nos. 7,454,500; 7,581,009; 7,558,195; and 7,774,833, filed May 17, 2012, 30 pages.
Civil Action CV10-03428—Declaration of Scott R. Mosko in Support of Defendants A10 Networks, Inc.'s, Lee Chen's, Rajkumar Jalan's, Ron Szeto's and Steve Hwang's Opposition to Plaintiff's Motion for Partial Summary Judgment Dismissing Invalidity Declaratory Relief Counterclaim and Invalidity Defense Regarding U.S. Pat. Nos. 7,454,500; 7,581,009; 7,558,195; and 7,774,833, filed May 17, 2012, 13 pages.
Civil Action CV10-03428—Order Granting in Part and Denying in Part A10's Motion for Summary Judgment, Jun. 12, 2012, 36 pages.
Civil Action CV10-03428—Order Granting Plaintiffs' Motion for Partial Summary Judgment Dismissing Invalidity Declaratory Relief Counterclaim and Invalidity Affirmative Defense Regarding U.S. Patent Nos. 7,454,500; 7,581,009; 7,558,195; and 7,774,833, Jun. 18, 2012; 20 pages.
Civil Action CV10-03428—Defendant and Counterclaim A10 Network, Inc.'s Amended Supplemental Claim Construction Brief, filed Jun. 30, 2012, 9 pages.
Civil Action CV10-03428—Plaintiff's Supplemental Claim Construction Brief, with Declarations of Azer Bestravros and Izhak Rubin, filed Jul. 3, 2012, 15 pages.
Civil Action CV10-03428—Further Claim Construction Order, Jul. 5, 2012, 4 pages.
Action Closing Prosecution, for Reexamination Control No. 95/001,806, mailed Sep. 25, 2012, 55 pages.
Action Closing Prosecution for Reexamination Control No. 95/001,807 mailed Jan. 4, 2013, 35 pages.
Third Party Requester's Opposition to Petition to Expunge Third Party Comments and Vacate Reexamination for Reexamination Control No. 95/001,806 filed Dec. 7, 2012, 11 pages.
Third Party Requester's Comments Under 35 U.S.C. §314(B)(2) and 37 C.F.R. §1.947 for Reexamination Control No. 95/001,806 filed on Dec. 26, 2012, 32 pages.
Third Party Requester's Comments Under 35 U.S.C. §314(B)(2) and 37 C.F.R. §1.947 for Reexamination Control No. 95/001,807 filed on Mar. 7, 2013, 34 pages.
Ex Parte Reexamination Certificate for Control No. 90/011,766 issued on Mar. 22, 2013, 2 pages.
Notice of Intent to Issue Ex Parte Reexamination Certificate for Control No. 90/011,766, mailed Feb. 27, 2013, 9 pages.
Third Party Requester's Opposition to Petition to Have Inter Partes Reexamination Vacated for Control No. 95/001,824 filed Jan. 28, 2013, 5 pages.
Decision on Petition to Have Inter Partes Reexamination Vacated, or Alternatively to Be Determined (Dismissed) for Control No. 90/001,824, mailed Mar. 22, 2013, 6 pages.
Right of Appeal Notice for Reexamination Control No. 95/001,812 mailed on Dec. 19, 2012, 1 page.
Third Party Requester's Comments Under 35 U.S.C. §314(B)(2) and 37 C.F.R. §1.947 for Reexamination Control No. 95/001,822 filed on Jul. 5, 2012, 24 pages.
Third Party Requester's Comments Under 35 U.S.C. §314(B)(2) and 37 C.F.R. §1.947 for Reexamination Control No. 95/001,827 filed on May 8, 2013, 29 pages.
Examiner's Answer to Appeal Brief for Reexamination Control No. 90/011,760, mailed on Apr. 29, 2013, 19 pages.
Examiner's Answer to Appeal Brief for Reexamination Control No. 90/011,761 mailed on Apr. 30, 2013, 20 pages.
Examiner's Answer to Appeal Brief for Reexamination Control No. 90/011,812 mailed on May 7, 2013, 3 pages.
Non-Final Office Action for U.S. Appl. No. 13/595,952 mailed Nov. 13, 2012, 5 pages.
Notice of Allowance for U.S. Appl. No. 13/595,952 mailed Apr. 11, 2013, 6 pages.
Notice of Withdrawal of Third Party Requester A10 Networks, Inc. For Reexamination Control No. 95/001,824 filed Jun. 13, 2013, 2 pages.
Notice of Withdrawal of Third Party Requester A10 Networks, Inc. for Reexamination Control No. 95/001,812 filed Jun. 13, 2013, 2 pages.
Notice of Withdrawal of Third Party Requester A10 Networks, Inc. for Reexamination Control No. 95/001,805 filed Jun. 13, 2013, 2 pages.
Notice of Withdrawal of Third Party Requester A10 Networks, Inc. for Reexamination Control No. 95/001,808 filed Jun. 13, 2013, 2 pages.
Notice of Withdrawal of Third Party Requester A10 Networks, Inc. for Reexamination Control No. 95/001,811 filed Jun. 13, 2013, 2 pages.
Notice of Withdrawal of Third Party Requester A10 Networks, Inc. for Reexamination Control No. 95/001,827 filed Jun. 13, 2013, 2 pages.
Notice of Withdrawal of Third Party Requester A10 Networks, Inc. for Reexamination Control No. 95/001,826 filed Jun. 13, 2013, 2 pages.
Notice of Withdrawal of Third Party Requester A10 Networks, Inc. for Reexamination Control No. 95/001,822 filed Jun. 13, 2013, 2 pages.
Notice of Withdrawal of Third Party Requester A10 Networks, Inc. for Reexamination Control No. 95/001,815 filed Jun. 13, 2013, 2 pages.
Notice of Withdrawal of Third Party Requester A10 Networks, Inc. for Reexamination Control No. 95/001,807 filed Jun. 13, 2013, 2 pages.
Notice of Withdrawal of Third Party Requester A10 Networks, Inc. for Reexamination Control No. 95/001,806 filed Jun. 13, 2013, 2 pages.
Notice of Withdrawal of Third Party Requester A10 Networks, Inc. for Reexamination Control No. 95/001,804 filed Jun. 13, 2013, 2 pages.
Notice of Withdrawal of Third Party Requester A10 Networks, Inc. for Reexamination Control No. 95/001,803 filed Jun. 13, 2013, 2 pages.

* cited by examiner

Figure 2: GSLB DNS proxy topology

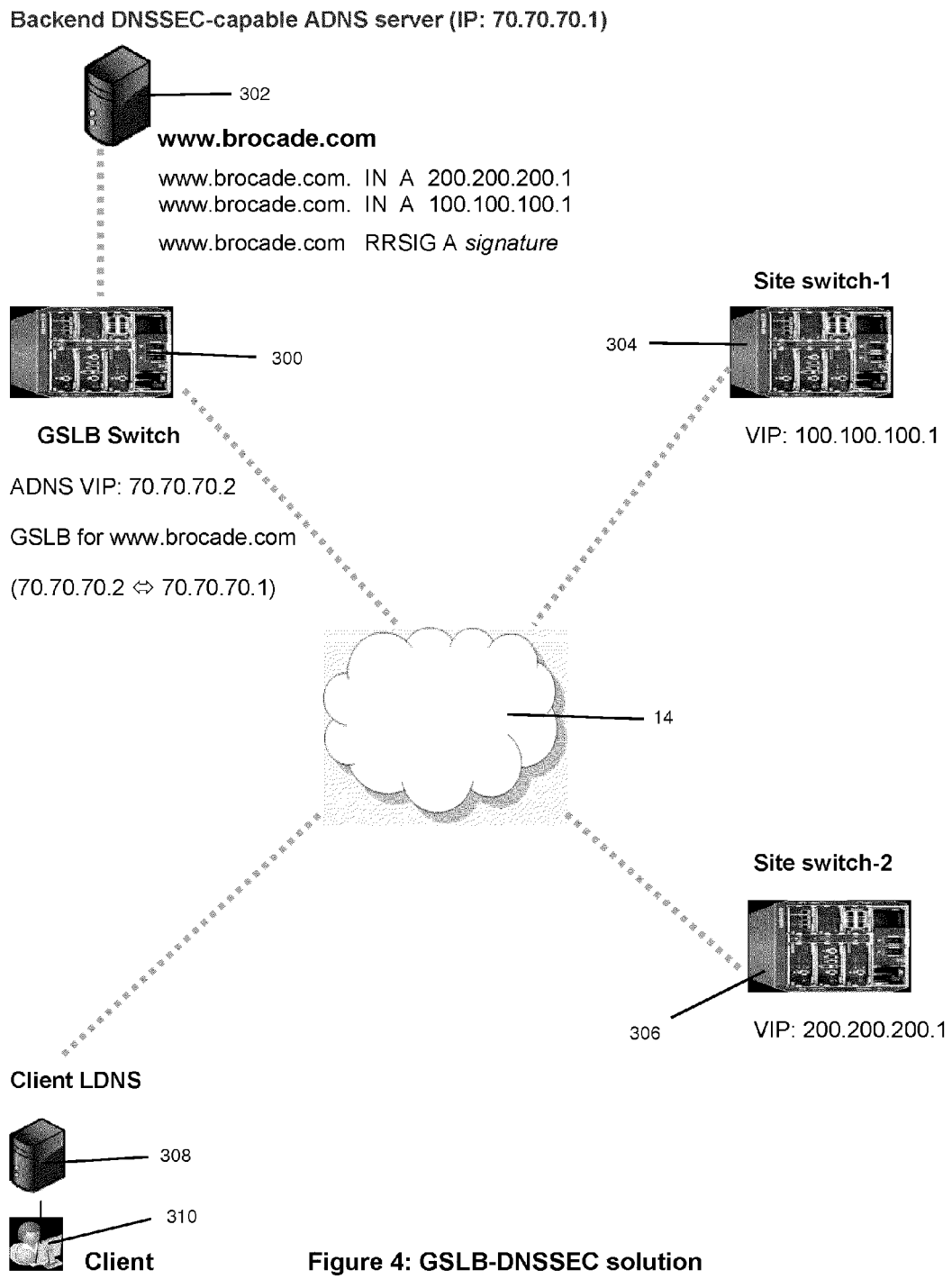
Figure 4: GSLB-DNSSEC solution

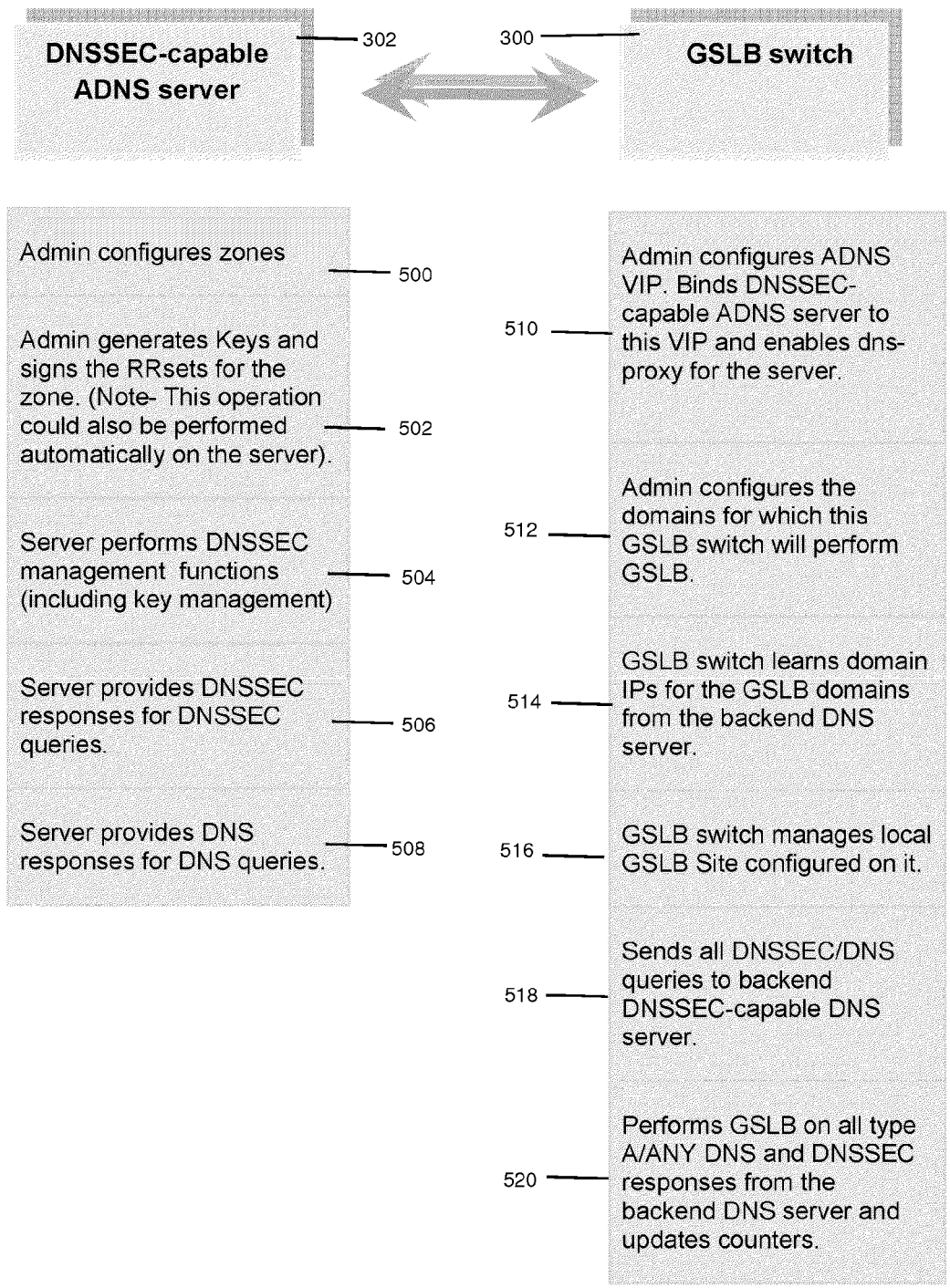

DOMAIN NAME SYSTEM SECURITY EXTENSIONS (DNSSEC) FOR GLOBAL SERVER LOAD BALANCING

CROSS REFERENCE TO RELATED APPLICATION

The present application is a continuation of U.S. Patent Application Ser. No. 12/916,390 entitled "DOMAIN NAME SYSTEM SECURITY EXTENSIONS (DNSSEC) FOR GLOBAL SERVER LOAD BALANCING," filed Oct. 29, 2010, now U.S. Pat. No. 8,549,148, issued Oct. 1, 2013, which claims the benefit of and priority under 35 U.S.C. §119 to U.S. Provisional Patent Application Ser. No. 61/393,796, entitled "DOMAIN NAME SYSTEM SECURITY EXTENSIONS (DNSSEC) FOR GLOBAL SERVER LOAD BALANCING," filed Oct. 15, 2010, which are incorporated herein by reference in their entirety.

TECHNICAL FIELD

The present disclosure generally relates to load balancing in a network and to domain name system security extensions (DNSSEC).

BACKGROUND INFORMATION

Domain Name System Security Extensions (DNSSEC) adds security to DNS. DNSSEC was designed to provide protection from certain attacks or threats, such as for example DNS cache poisoning. An approach used by DNSSEC is to add digital signatures to responses/replies to DNS queries.

BRIEF SUMMARY

According to one aspect, an apparatus comprises:
a load balance switch configured to balance load or to direct requests by reordering network addresses in a resource record set contained in a domain name system security extensions (DNSSEC) reply, and further configured to preserve an original signature generated by a DNSSEC-capable device for the resource record set contained in said DNSSEC reply.

According to another aspect, a method to operate a load balance switch comprises:
balancing load or directing requests, by the load balance switch, by reordering network addresses in a resource record set contained in a domain name system security extensions (DNSSEC) reply; and
preserving, by the load balance switch, an original signature generated by a DNSSEC-capable device for the resource record set contained in said DNSSEC reply.

According to still another aspect, an article of manufacture for a load balance switch comprises:
a tangible computer-readable medium having computer-readable instructions stored thereon that are executable by a processor to:
balance load or direct requests, by the load balance switch, by reordering network addresses in a resource record set contained in a domain name system security extensions (DNSSEC) reply; and
preserve, by the load balance switch, an original signature generated by a DNSSEC-capable device for the resource record set contained in said DNSSEC reply.

According to yet another aspect, an apparatus comprises:
a load balance switch configured to balance load by reordering network addresses in a resource record set contained in a domain name system security extensions (DNSSEC) reply, and further configured to support DNSSEC without recalculating a signature for said resource record set contained in said DNSSEC reply.

According to one aspect, an apparatus comprises:
a load balance switch configured to balance load by reordering network addresses in a resource record set contained in a domain name system security extensions (DNSSEC) reply, and further configured to output an original signature generated by a DNSSEC-capable device for said resource record set contained in said DNSSEC reply.

According to one aspect of the apparatus, the load balance switch is further configured to:
modify a time to live (TTL) value, corresponding to at least one of the network addresses, from an original TTL value to a current TTL value; and
output another TTL value, for said original signature generated by said DNSSEC-capable device, having a same value as said original TTL value.

According to one aspect of the apparatus:
said DNSSEC reply is received by said load balance switch from said DNSSEC-capable device, which includes an authoritative DNS server that generated said original signature; and
said original signature is generated using a canonical order of said network addresses and said original TTL value.

According to one aspect of the apparatus, said another TTL value is contained in said original signature.

According to one aspect of the apparatus, said load balance switch is further configured to obtain count data related to load balancing operations or DNSSEC operations.

According to another aspect, a method to operate a load balance switch comprises:
balancing load, by the load balance switch, by reordering network addresses in a resource record set contained in a domain name system security extensions (DNSSEC) reply; and
outputting, by the load balance switch, an original signature generated by a DNSSEC-capable device for said resource record set contained in said DNSSEC reply.

According to one aspect, the method further comprises:
modifying, by the load balance switch, a time to live (TTL) value, corresponding to at least one of the network addresses, from an original TTL value to a current TTL value; and
outputting, by the load balance switch, another TTL value, for said original signature generated by said DNSSEC-capable device, said another TTL value having a same value as said original TTL value.

According to one aspect, the method further comprises obtaining, by said load balance switch, count data pertaining to load balancing operations or DNSSEC operations.

According to still another aspect, an article of manufacture for a load balance switch comprises:
a tangible computer-readable medium having computer-readable instructions stored thereon that are executable by a processor to:
balance load, by the load balance switch, by reordering network addresses in a resource record set contained in a domain name system security extensions (DNSSEC) reply; and
output, by the load balance switch, an original signature generated by a DNSSEC-capable device for said resource record set contained in said DNSSEC reply.

According to one aspect of the article of manufacture, the tangible computer-readable medium further has computer-readable instructions stored thereon that are executable by the processor to:

modify, by the load balance switch, a time to live (TTL) value, corresponding to at least one of the network addresses, from an original TTL value to a current TTL value; and output, by the load balance switch, another TTL value, for said original signature generated by said DNSSEC-capable device, said another TTL value having a same value as said original TTL value.

According to one aspect of the article of manufacture, the tangible computer-readable medium further has computer-readable instructions stored thereon that are executable by the processor to:

obtain, by said load balance switch, count data pertaining to load balancing operations or DNSSEC operations.

According to still another aspect, a system is configured to provide load balancing and configured to use domain name system security extensions (DNSSEC) to provide data origin authentication and data integrity to a DNSSEC reply that replies to a DNS query requesting resolution of a domain name into one or more network addresses, said provided data origin authentication and data integrity being usable to protect a recipient of the network addresses, such as a client device or a local DNS server, from forgery or corruption of the network addresses contained said DNSSEC reply, the system comprising:

a DNSSEC-capable authoritative DNS (ADNS) server configured to:
  generate said DNSSEC reply that contains said network addresses;
  generate an original signature by calculating said signature using: (a) an original time to live (TTL) value corresponding to at least one of the network addresses contained in the DNS reply and (b) a canonical order of the network addresses contained in said DNSSEC reply;
  include the generated original signature along with the DNSSEC reply, the generated original signature also including a signature TTL value that is same in value as said original TTL value; and
  output the DNSSEC reply having the generated original signature included therewith;

a load balance switch coupled to front-end the DNSSEC-capable ADNS server so as to intercept from the DNSSEC-capable ADNS server the outputted DNSSEC reply having the generated original signature included therewith, the load balance switch being configured to:
  balance load amongst the network addresses, which are in a resource record set contained in the DNSSEC reply, by reordering said network addresses, using a plurality of performance metrics, so to place a preferred network address on top to thereby identify the preferred network addresses, wherein said reorder of the network addresses may have the network addresses listed in a different order than said canonical order; and
  perform said reorder while maintaining said original signature that was generated by said DNSSEC-capable ADNS server for said resource record set contained in said DNSSEC reply, such that the load balance switch outputs said DNSSEC reply having the reordered addresses and same said original signature that was generated by said DNSSEC-capable ADNS server for said resource record set; and
  change said original TTL value corresponding to at least one of the network addresses in said reordered list to a current TTL value and include the current TTL value in said outputted DNS reply, and maintain for the generated original signature said signature TTL value that is same in value as said original TTL value; and at least one other device, which may be either or both a client device or some other network device such as a local DNS server, configured to:
  receive, from the load balance switch, the DNSSEC reply having the reordered addresses and the original signature generated by said DNSSEC-capable ADNS server, and store the reordered addresses with the preferred network addresses shown on top;
  place the network addresses back into said canonical order so as to calculate another signature;
  replace said current TTL value with the signature TTL value of the original signature that was maintained by the load balance switch;
  validate said DNSSEC reply by generating another signature, said another signature being generated using a key, said canonical order of the addresses instead of said reorder of the addresses, and said original TTL value rather than said current TTL value, said DNSSEC reply being validated if said another signature matches said original signature generated by said DNSSEC-capable ADNS server; and
  enable connection of the client device to the preferred network address shown on top of the stored addresses, wherein the load balance switch is able to make modifications that include said reorder of the network address and said change of the current TTL value, such that the original signature generated by said DNSSEC-capable ADNS server is maintained, since said at least the another device places the network addresses back into the canonical order and is able to obtain the original TTL value from the signature TTL value, in order to generate said another signature.

According to one aspect of the system, in addition to said generation of said original signature, said DNSSEC-capable ADNS server is configured to perform a plurality of operations that includes key generation, key rollover, zone signing, and other DNSSEC management operations, instead of said load balance switch performing said plurality of operations.

According to one aspect of the system, since the load balance switch is configured to maintain the original signature generated by the DNSSEC-capable ADNS server, the DNSSEC-capable ADNS server is enabled to transfer for storage and use a key, configured at the DNSSEC-capable ADNS server, to said at least another device instead of the load balance switch.

According to one aspect of the system, said DNSSEC-capable ADNS server is configured at the load balance switch as a real remote server, with a virtual IP address configured at the load balance switch being bound to said server.

According to one aspect of the system, the load balance switch is further configured to obtain count data related to load balancing operations or DNSSEC operations.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 4 illustrates a GSLB-DNSSEC solution according to one embodiment.

FIG. 5 are flowcharts showing some operations of a GSLB-DNSSEC solution according to one embodiment.

DETAILED DESCRIPTION

Figure 1:
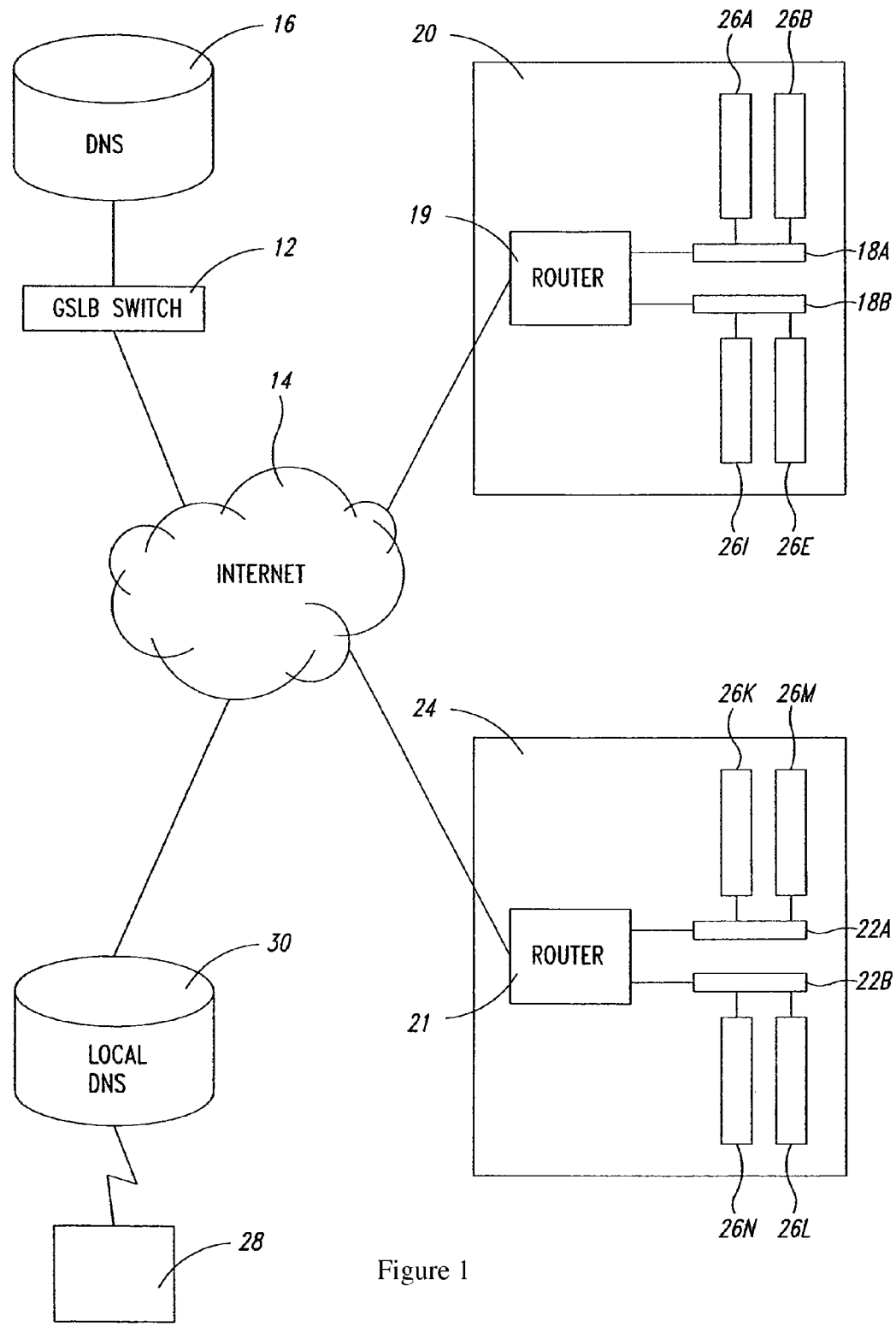
FIG. 1 illustrates a global server load balancing (GSLB) configuration with which one embodiment may be implemented.

Embodiments to implement domain name system security extensions (DNSSEC) with global server load balancing (GSLB) are described herein. In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present disclosure relates generally to load balancing among network addresses. More particularly but not exclusively, the present disclosure relates to load balancing methods, devices, and systems that provide an address expected to serve a client with optimal or improved performance in a given application.

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of IP addresses, so as to distribute equally the requests for access among the host servers.

The conventional method described above for resolving a host name to its IP addresses has several shortcomings. First, the authoritative DNS server does not detect a server that is down. Consequently, the authoritative DNS server continues to return a disabled host server's IP address until an external agent updates the authoritative DNS server's resource records. Second, when providing its list of IP addresses, the authoritative DNS sever does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., those corresponding to a downed server) to persist in a local DNS server until the TTLs for the invalid IP addresses expire.

One technique to address these shortcomings is a global server load balancing system provided by Brocade Communication Systems, Inc. of San Jose, Calif. As one example, Brocade provides the ADX product to add intelligence to authoritative DNS servers by serving as a proxy to these servers. The ADX has a global server load balancing (GSLB) feature that intelligently uses health-checks and other methods to assess the availability and responsiveness of the host sites in the DNS reply. When necessary, the ADX product exchanges the IP address at the top of the address list returned by the authoritative DNS server with another IP address selected from the list, based on a set of performance metrics indicative of which particular host server may provide the optimum or otherwise improved access. Thus, the GSLB feature ensures that a client always receives a DNS reply for a host site that is available and is the best or better choice among the available hosts. Example embodiments for global server load balancing are disclosed in U.S. Pat. Nos. 7,086,061, 7,254,626, 7,423,977, 7,454,500, 7,496,651, 7,574,508, 7,581,009, 7,584,301, 7,657,629, 7,676,576, and 7,756,965, U.S. Patent Application Publication No. 2010/0010991, U.S. Patent Application Publication No. 2010/0011120, U.S. Patent Application Publication No. 2010/0011126, U.S. Patent Application Publication No. 2010/0061236, U.S. Patent Application Publication No. 2010/0082787, U.S. Patent Application Publication No. 2010/0095008, U.S. Patent Application Publication No. 2010/0115133, U.S. Patent Application Publication No. 2010/0121932, U.S. Patent Application Publication No. 2010/0153558, U.S. patent application Ser. No. 11/429,177 filed May 5, 2006, U.S. patent application Ser. No. 12/272,618 filed Nov. 17, 2008, and U.S. patent application Ser. No. 12/787,779 filed May 26, 2010. All of these patents and patent applications are incorporated herein by reference their entireties.

As an overview, GSLB enables a network device (such as a switch configured to perform GSLB) to add intelligence to authoritative DNS servers by serving the best IP address to a local DNS server. As a DNS proxy, the GSLB switch evaluates the IP addresses in the DNS replies from the authoritative DNS server for domains for which the GSLB switch is a proxy. Based on the results of the evaluation, the GSLB switch changes the order of the addresses in the DNS reply so that the domain's "best" IP address for the client is placed on top of a list of the addresses. In one embodiment, the GSLB switch also modifies the time-to-live (TTL) value of these IP address records in the DNS response to some amount of time, such as 10 seconds by default or to some other configurable value.

In one embodiment, the GSLB switch front ends the authoritative DNS server if the GSLB switch is configured in a GSLB DNS proxy mode. The zone configuration is done on this authoritative DNS server in one embodiment. The domains, for which GSLB is to be performed by the GSLB switch, are then configured on the GSLB switch. The GSLB switch learns the IP addresses for these domains in one embodiment via a DNS query to the authoritative DNS server. In one embodiment, the GSLB switch gathers information for these IP addresses (such as health, load, geographic location, latency etc) depending on the GSLB policy configured in the GSLB switch.

When the local DNS server sends a DNS query, the GSLB switch forwards this query to the authoritative DNS server and then modifies the DNS response for a Type A/ANY query from the authoritative DNS server, so as to place the best IP address at the top of the DNS response before sending DNS response to the local DNS server.

As noted above for one embodiment, the GSLB switch performs GSLB only on Type A and Type ANY responses. The GSLB switch of one embodiment sends all other responses unaltered. For a Type ANY query, the GSLB switch of one embodiment performs GSLB only for the A records contained in the DNS response, and leaves all other record types unchanged.

The patents and patent applications identified above disclose various techniques by the GSLB switch to use one or more performance metrics in order to rank/order the addresses on the list. In one embodiment, the features of the GSLB switch described above and elsewhere herein are provided such that GSLB may be performed in conjunction with operations performed by an authoritative DNS server that is DNSSEC-capable. In one embodiment, the GSLB switch may also additionally or alternatively be configured to direct or redirect requests to a specific system(s)/device(s).

FIG. 1 illustrates one example global server load balancing configuration with which an embodiment may be used. As shown in FIG. 1, a GSLB switch 12 is connected to an Internet 14 or other network and acts as a proxy to an authoritative Domain Name System (DNS) server 16 for the domain "brocade.com" (for example). That is, while the actual DNS service is provided by DNS server 16, the IP address known to the rest of the Internet 14 for the authoritative DNS server 16 of the domain "brocade.com" is a virtual IP (VIP) address configured on GSLB switch 12. Of course, DNS server 16 can also act simultaneously as an authoritative DNS for other domains. In one embodiment, the DNS server 16 may be DNSSEC-capable.

The GSLB switch 12 communicates, via the Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, . . . , 26I, . . . 26N. Some or all of servers 26A, . . . , 26I, . . . , 26N may host application server programs (e.g., http and ftp). These host servers are reached through site switches 18A, 18B, 22A and 22B using one or more virtual IP addresses configured at the site switches, which act as proxies to the host servers. A suitable switch or other network device for implementing either GSLB switch 12 or any of site switches 18A, 18B, 22A and 22B is the ADX product available from Brocade Communication Systems, Inc. or the ServerIron™ product previously from Foundry Networks, Inc. (now a subsidiary of Brocade Communication Systems, Inc.).

FIG. 1 also shows client program 28 connected to Internet 14, and communicates with local DNS server 30. When a browser on client 28 requests a web page, for example, using a Universal Resource Locator (URL), such as http://www-.brocade.com/index.htm, a query is sent to local DNS server 30 to resolve the symbolic host name www.brocade.com to an IP address of a host server. The client program receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. This list of IP addresses is ordered by GSLB switch 12 based on performance metrics as described in further detail in the various patents and patent applications identified above. For the sake of brevity, these various performance metrics and the manner in which they are used in a GSLB algorithm or GSLB policy to identify best sites in a list of IP addresses are summarized and not described in detail herein. Such additional details may be found in these patents and patent applications.

In the remainder of this detailed description, for the purpose of illustrating embodiments only, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for client 28 and returns the IP address list with a virtual IP address configured at that site switch placed at the top. (Other forms of ranking or weighting the IP addresses in the list can also be possible.) Client program 28 can receive the ordered list of IP addresses, and typically selects the first IP address on the list to access the corresponding host server.

Figure 2:
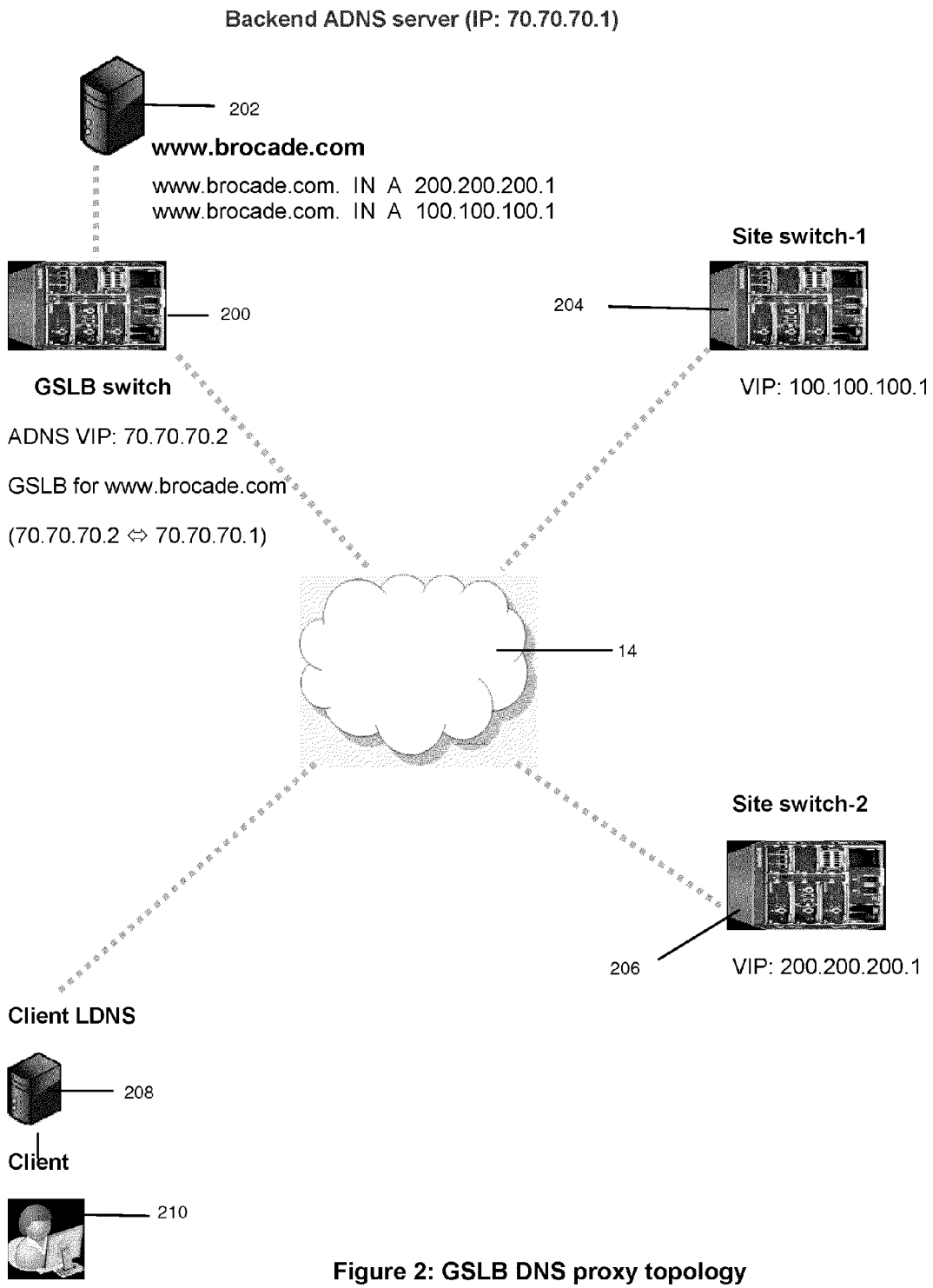
FIG. 2 further illustrates a GSLB configuration with which one embodiment may be implemented.

FIG. 2 provides an example embodiment of a GSLB configuration where a GSLB switch 200 is configured as a proxy to an authoritative DNS server 202 at the backend and is configured to provide GSLB for www.brocade.com. The authoritative DNS server 202 (having an IP address of 70.70.70.1 for example) is front-ended by the GSLB switch 200. The IP address for the authoritative DNS server 202 known to the rest of the Internet is a VIP address of 70.70.70.2 (for example) configured on the GSLB switch 200. Site switches 1 and 2 (204 and 206) for www.brocade.com in this example have VIP addresses of 100.100.100.1 and 200.200.200.1 respectively, and these VIP addresses are provided to the authoritative DNS server 202. The GSLB switch 200 is configured to perform GSLB for these VIP addresses.

As explained above, when a local DNS server 208 sends a DNS query in response to a request from a client 210 to access www.brocade.com, the GSLB switch 200 forwards this query to the authoritative DNS server 202 and then modifies the DNS response (having the VIP addresses of 100.100.100.1 and 200.200.200.1 therein) received from the authoritative DNS server 202, so as to place the best or preferential IP address at the top of the DNS response before sending DNS response to the local DNS server 208.

Figure 3:
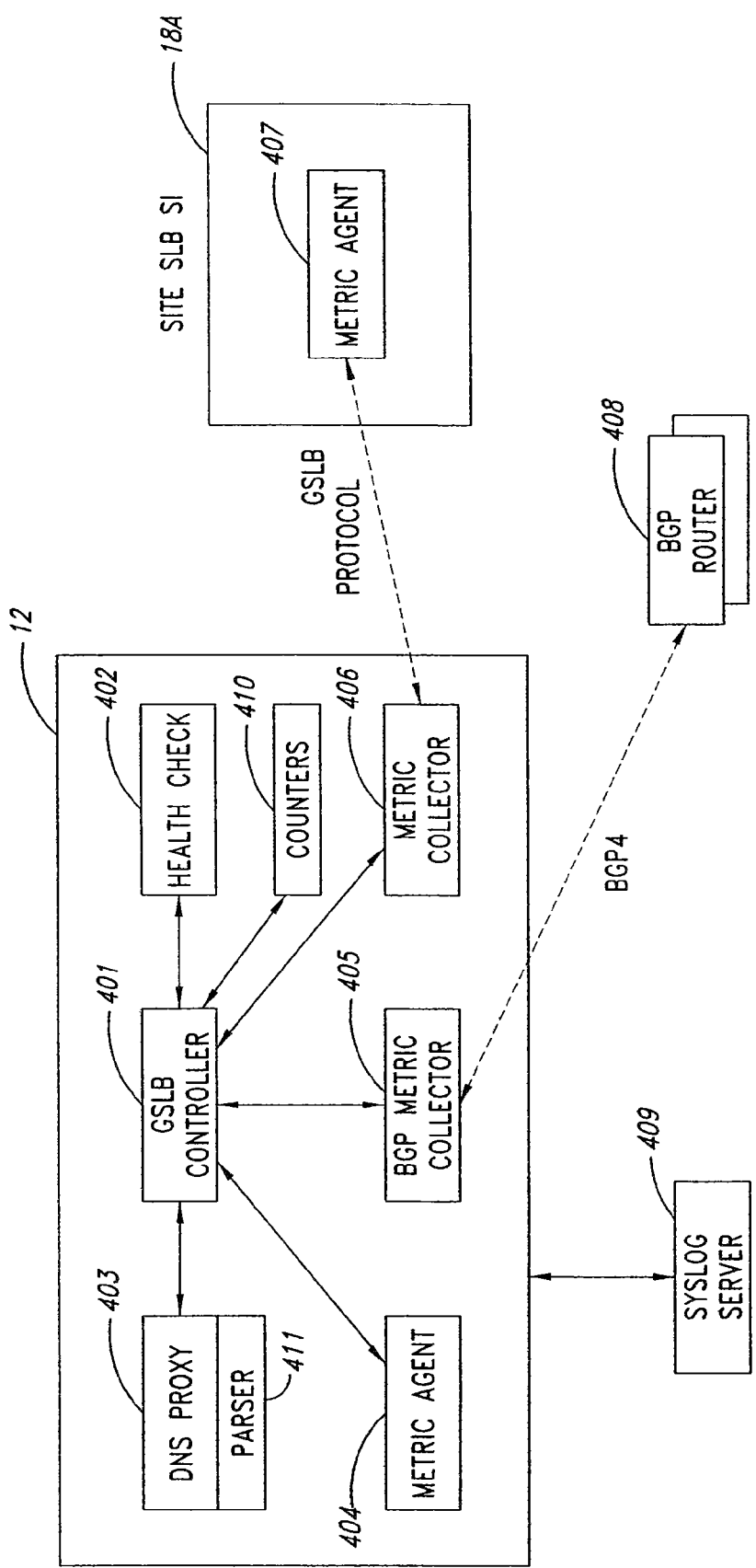
FIG. 3 is a block diagram showing the functional modules of a GSLB switch and a site switch in accordance with one embodiment.

FIG. 3 is a block diagram showing the functional modules of a GSLB switch and a site switch, such as the GSLB switch 12 and site switch 18A (for instance) or other GSLB switch and site switch shown and described herein, relevant to the global server load balancing function in one embodiment. As shown in FIG. 3, GSLB switch 12 includes a GSLB switch controller 401, health check module 402, DNS proxy module 403, metric agent 404, routing metric collector 405, and site-specific metric collector 406, some or all of which may be present on a chip, network card, or other hardware structure contained in a housing or chassis. GSLB switch controller 401, which can include hardware components in one embodiment, provides general control functions for the operation of GSLB switch 12. Health check module 402 is responsible for querying, either periodically or on demand, host servers and relevant applications hosted on the host servers to determine the "health" (e.g., whether or not it is available) of each host server and each relevant application. Site-specific metric collector 406 communicates with metric agents in site-specific switches (e.g., FIG. 3 shows site-specific metric collector 406 communicating with site-specific metric agent 407 of a site server load balancing ServerIron or "SLB SI" or ADX or other site switch product) to collect site-specific metrics (e.g., number of available sessions on a specific host server and/or connection-load data indicative of connections-per-second at that host server).

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 and/or GSLB switch controller 401 (A) receives incoming DNS requests, (B) provides the host names to be resolved to DNS server 16, (C) receives from DNS server 16 a list of responsive IP addresses, (D) orders the IP addresses on the list received from DNS server 16 according to an embodiment, using the metrics collected by routing-metric collector 405 and site specific collector 406, and values of any other relevant parameter, and (E) provides the ordered list of IP addresses to the requesting DNS server. Since GSLB switch 12 can also act as a site switch, GSLB switch 12 is provided site-specific metric agent 404 for collecting metrics for a site-specific metric collector.

One embodiment provides a method to track inbound DNS requests, DNS responses, and related processing, as well as tracking other types of information. For example, the GSLB switch 12 is provided with capability to track data associated with the originator of the DNS request and with the decision process used to select the best IP address for that DNS request. Such tracking data can include the inbound source IP address of the originator of the DNS request, the requested host names and zone (e.g., for www.gslb.com, the host is "www" and the zone is "gslb.com"), the IP address that was selected as "best" in response to that DNS request, and the particular selection metric that was used to decide on that best IP address. It is appreciated that other types of data associated with the inbound DNS request and with the decision to select an IP address may be tracked by other embodiments, and that the types of data to be tracked are not restricted to those specifically identified herein.

In an embodiment, at least some of the data to be tracked can originate from the DNS proxy module 403 in cooperation with the switch controller 401 as needed. For example, since the DNS proxy module 403 receives incoming DNS requests and provides the host names to be resolved to the authoritative DNS server 16 and also receives the replies to the queries from the authoritative DNS server 16, the DNS proxy module 403 can include or otherwise use a parser 411 (or other software component) to identify and extract (from the DNS reply received from the authoritative DNS server 16 in one embodiment and/or from the original request in another embodiment) the source IP address and the requested zone and host. The parser 411 of one embodiment can be used to extract other data, such as but not limited to, TTL values, address records contained in the DNS reply, signature information, or other information.

To track the returned best IP address and the particular metric used to identify this IP address, one embodiment uses the switch controller 401 to track this information while performing and completing the GSLB algorithm. Alternatively or in addition, the DNS proxy module 403 (via use of the parser 411) may be used to identify and extract the best IP address from the list of responsive IP addresses after completion of the GSLB algorithm.

In an embodiment, one or more servers or other network device external to the GSLB switch 12 can be used to receive and log (for storage and subsequent access) the data tracked in the manner described above. An example of such a server is a system log ("syslog") server 409 shown in FIG. 3 that includes a computer-readable storage medium to store the tracked data. The syslog server 409 can be communicatively coupled to the GSLB switch 12 by way of the DNS proxy module 403 or via other communication interface suitable to transfer the tracked data from the GSLB switch 12 to the syslog server 409.

Alternatively or in addition, the data-logging capabilities provided by the syslog server 409 can be configured in the GSLB switch 12 itself, such as a computer-readable storage medium (such as a memory or other tangible/non-transitory storage unit) of the GSLB switch 12 that is configured to receive and log the tracked data and to provide accessibility to the logged data for troubleshooting and maintenance purposes. Still alternatively or in addition, syslog servers 409 may be located at the sites 20 and 24, and can be configured to transfer their logged data to other syslog servers 409, if needed, for further processing, storage, and access.

The tracking at the syslog server 409 and/or at the GSLB switch 12 can be enabled or disabled via one or more user (e.g., a system administrator) commands. For instance, a command line interface (CLI) command can be used to enable/disable the logging of all the data, or selective ones of the data in one other embodiment. The CLI command can be entered via any suitable user interface in the GSLB system, and by default in an embodiment, the logging is disabled until later specifically enabled by a CLI command.

Another embodiment provides counters at the metric-level granularity to count the number of times a particular metric was used as the deciding factor over other metrics in identifying the best IP address. As an additional feature, other counters can be provided that track the number of times each IP address (e.g., VIP address) was selected as the "best" IP address, or other counters can be used to track other data/information.

FIG. 3 shows one embodiment of the GSLB switch 12 that includes a plurality of counters 410 that may be used to count certain pieces of information/data that will be explained later below. While the embodiment of FIG. 3 shows the counters 410 as being separate components, counting capability can be configured in the metric collectors 405 and 406 or in other components of the GSLB switch 12, or combination of components thereof. According to an embodiment, a separate counter 410 is provided for each VIP and/or separately for some other component of data, thereby providing (for example) a count of how many times that VIP was chosen as the best IP address based on a particular metric. Thus, if VIP-1 was selected 100 times, its metric counter would show that of those 100 times, VIP-1 was selected 20 times based on round trip time (RTT), 40 times based on capacity, 40 times based on round-robin, for example.

In an embodiment, additional counter(s) can be provided to count the number of times (e.g., 100 times in the preceding example) that each VIP is selected. These additional counters can be configured similarly as the counters 410 within the GSLB switch 12, except that they are counting a different type of occurrence.

Again, the count data can be accessed and viewed by a system administrator for purposes of maintenance, troubleshooting, pre-deployment planning, or other purpose(s). For instance, if the count data for a particular VIP shows a very high count for the connection-load metric, then this data suggests that the VIP has won over the other choices because the others failed to pass the connection-load limit threshold. This indicates that the other VIPs are facing a very high load of connections-per-second, which signals the system administrator to take proper measures, if that is not intended. Such measures can include, for example, diverting some of the connections to less-busy servers or installing additional servers to handle the heavy load.

As another example, if a system administrator suspects that something is wrong with addresses being provided to Australian clients, the administrator can enable the tracking mechanism to log client requests and DNS replies. In the log data, if an Australian client is given a United States address based on RTT, this may indicate that the more-closer Australian server (s) are down or busy, and therefore need troubleshooting service so that the Australian clients can be provided with the IP addresses for the Australian servers.

With regards to the metrics that are applicable to the tracking operations described above, the metrics used in a GSLB switch 12 in one embodiment include (a) the health of each host server and selected applications, (b) each site switch's session capacity threshold, (c) the round trip time (RTT) between a site switch and a client in a previous access, (d) the geographical location of a host server, (e) the connection-load measure of new connections-per-second at a site switch, (f) the current available session capacity in each site switch, (g) the "flashback" speed between each site switch and the GSLB switch (i.e., how quickly each site switch responds to a health check from the GSLB switch), (h) a policy called the "Least Response Selection" (LRS) which prefers the site least selected previously, or (i) other metrics, such as those disclosed in the patents and patent applications identified above. Many of these performance metrics can be provided default values. Each individual metric can be used in any order, such as an order of (a) through (i) identified above, and each metric can be disabled if desired. In one embodiment, the LRS metric is always enabled.

To briefly describe herein one embodiment of a GSLB algorithm (embodiments of which are described in further detail in the patents co-pending applications previously identified above), assume for purposes of illustration that the metric order is (a) through (i) as identified above. Upon receiving the IP address list from the authoritative DNS server 16, GSLB switch 12 performs, for each IP address on the IP address list (e.g., host server 261 connected to site switch 18B), a layer 4 health check and a layer 7 check. Such a health check can be achieved, for example, by a "ping-like" operation defined under the relevant protocol, such as sending SYN/ACK packets under the TCP protocol. If a host server or an associated application fails any of the health checks it is disqualified from being the "best" site and may be excluded from the IP address list to be returned to client program 28.

If the resulting list of IP addresses has only one IP address, then the list of IP addresses is returned to client program 28. Otherwise if there are multiple IP addresses remaining, the IP address list is assessed under the next metric in the algorithm, which is the "capacity threshold" of the site switch serving that IP address. The virtual IP address configured at site switch 18B, for example, may be disqualified from being the "best" IP address if the number of sessions for switch 18B exceed a predetermined threshold percentage (e.g., 90%) of the maximum number of sessions that the site switch can serve. If the resulting list of IP addresses has only one IP address, then list of IP addresses is returned to client program 28.

If, however, the IP address list has multiple IP addresses, the remaining IP addresses on the list can then be reordered based upon a round-trip time (RTT) between the site switch for the IP address (e.g., site switch 18B) and the client (e.g., client 28). The RTT is computed (and stored), for instance, for the interval between the time when a client machine requests a TCP connection to a proxy server configured on a site switch, sending the proxy server a TCP SYN packet, and the time a site switch receives from the client program a TCP ACK packet. Again, if the top entries on the list of IP addresses do not have equal RTTs, the list of IP addresses is returned to client program 28.

If multiple sites have equal RTTs, then the list is reordered based upon the next metric in the GSLB algorithm, which is based on the location (geography) of the host server. The GSLB switch prefers an IP address that is in the same geographical region as the client machine in an embodiment. If the top two entries on the IP list are not equally ranked, the IP list is sent to the client program 28.

After using the geographic metric, if multiple sites are of equal rank for the best site, the IP addresses can then be reordered based upon site connection load. The connection-load metric feature allows comparison of sites based on the connection-load on their respective agent (e.g., at the metric agent 407 of the site ServerIron switch 18A in FIG. 3, for instance). The connection-load is a measure of new connections-per-second on the agent 407 in one embodiment. If a calculated average load is less than a specified load limit, the site is passed on to the next stage of the GSLB algorithm—otherwise that site is eliminated/rejected from the set of potential candidates.

If there are no multiple candidates at the top of the IP list that have passed the connection-load metric (or there are none of equal rank), then the IP address list is sent to the client program 28. If multiple sites are of equal rank for the best site, the IP addresses can then be reordered based upon available session capacity, which is the next metric in the GSLB algorithm. For example in one embodiment, if switch 18A has 1,000,000 sessions available and switch 22B has 800,000 sessions available, switch 18A is then preferred, if a tolerance limit, representing the difference in sessions available expressed as a percentage of capacity in the larger switch, is exceeded. If an IP address is preferred, the IP address will be placed at the top of the IP address list, and is then returned to the requesting entity. Otherwise, if the session capacity does not resolve the best IP address, then resolution is based upon a "flashback" speed. The flashback speed is a time required for a site switch to respond to layers 4 and 7 health checks by the GSLB switch in one embodiment. The preferred IP address will correspond to a flashback speed exceeding the next one by a preset tolerance limit.

If a best IP address is resolved, the IP address list is sent to client program 28. Otherwise, an IP address in the site that is least often selected to be the "best" site (e.g., the LRS metric) is chosen. After eventually evaluating all of the applicable metrics, the IP address list is then sent to client program 28. Upon receipt of the IP address list, the client program 28 uses the best IP address selected (i.e., the top of the list) to establish a TCP connection with a host server.

With regards DNSSEC, one embodiment enables the GSLB switch, such as the GSLB switch 12 or other GSLB switch shown and described herein, to operate in conjunction with a DNSSEC-capable authoritative DNS server, such as if the authoritative DNS server 16 described above is configured to provide DNSSEC capability. Therefore, such a GSLB switch can be configured to perform load balancing and/or to direct or redirect requests to one or more system(s) or device(s) while being configured to support DNSSEC operations.

The original design of the Domain Name System (DNS) did not include security; instead it was designed to be a scalable distributed system. The Domain Name System Security Extensions (DNSSEC) attempts to add security, while maintaining backward compatibility. DNSSEC was designed to protect Internet resolvers (e.g., clients) from forged DNS data, such as that created by DNS cache poisoning. All responses (to a DNS query) in DNSSEC are digitally signed with a digital signature. By checking the digital signature, a DNS resolver is able to check if the information is identical (correct and complete) to the information on the authoritative DNS server. DNSSEC protects DNS query/response transactions by providing data origin authentication, data integrity verification, and authenticated denial of existence capabilities. DNSSEC does not attempt to provide confidentiality. See the article on DNSSEC at http://en.wikipedia.org/wiki/Domain_Name_System_Security_Extensions.

One concept in DNS is the Resource Record (RR) and the Resource Record Set (RRset).

An RR in DNS is for instance:
www.brocade.com. IN A 200.200.200.1

In the example above, www.brocade.com is the domain-name, IN is the class (IN stands for Internet). A is the type (A stands for "address.") and the IP address following A is the data for the A record (called rdata). This 3-tuple (name, class, type) together makes up the resource record RR. RRset are all the RRs that have an identical name, class and type. Only the rdata is different.

Thus, the following two A records form an RRset:
www.brocade.com. IN A 200.200.200.1
www.brocade.com. IN A 100.100.100.1

However the two RRS below do not form an RRset because their type is different:
www.brocade.com. IN A 50.50.50.50
www.brocade.org.IN MX mail.brocade.com.

In DNSSEC, the DNSSEC-capable authoritative DNS server generates a signature for each RRset. The DNSSEC-capable DNS server includes this signature along with the RRs in the DNSSEC response. The local DNS server (or resolver, such as the local DNS server 30) validates this signature when it receives this response from the DNSSEC-capable authoritative DNS server and accepts the response only if the signature is valid (e.g., the signature generated by the local DNS server using keys and the received data matches the signature in the response).

Further details of DNSSEC features also can be found in the following Request for Comments (RFC) documents:

Network Working Group, RFC 4033, "DNS Security Introduction and Requirements," March 2005;

Network Working Group, RFC 4034, "Resource Records for the DNS Security Extensions," March 2005; and Network Working Group, RFC 4035, "Protocol Modifications for the DNS Security Extensions," March 2005.

Still further details of DNSSEC can be found in National Institute of Standards and Technology (NIST), "Secure Domain Name System (DNS) Deployment Guide," Special Publication 800-81, May 2006.

The following two approaches are possible to merge GSLB capability with DNSSEC. However, as explained below, such approaches suffer from certain drawbacks.

Approach 1

The backend authoritative DNS server does not perform any DNSSEC operations and responds only with DNS responses. Key generation, key rollovers, zone signing and other DNSSEC management functions are performed by a GSLB switch.

This approach has a number of drawbacks:

Most users/systems have existing infrastructures with backend DNS servers (which are/can be upgraded to be DNSSEC capable) or DNSSEC signers front-ending their DNS servers and would like to use such DNS servers or DNSSEC signers for DNSSEC, instead of delegating DNSSEC task(s) to the GSLB switch.

Users generally prefer all zone management functions to be under the control of and performed by the backend authoritative DNS server, instead of delegating this authority to a GSLB switch. This will not be possible or will be difficult if all DNSSEC responsibility is handed over to the GSLB switch.

Approach 2

A DNSSEC-capable authoritative DNS server signs all the zones. When a GSLB switch performs GSLB, the GSLB switch re-signs the response. This approach has a number of drawbacks:

This approach entails that the keys configured on the backend authoritative DNS server need to be transferred to the GSLB switch and stored securely on the GSLB switch. This task can be complex and laborious for users, such as system administrators.

Re-signing after GSLB is performed adds additional complexity and processing overhead.

In contrast to the above two approaches, the embodiment(s) of the GSLB-DNSSEC solution disclosed herein provides a seamless way of supporting GSLB for DNSSEC queries without the drawbacks and overheads associated with the above approaches and other approaches.

According to one embodiment, the GSLB-DNSSEC solution provides GSLB for DNSSEC responses from a DNSSEC-capable authoritative DNS server without the need for key generation, key transfer, or signing/re-signing of these DNSSEC responses by the GSLB switch. In one embodiment of the GSLB-DNSSEC solution, the GSLB switch sits in front of the DNSSEC-capable authoritative DNS server. According to one embodiment of the GSLB-DNSSEC solution:

An administrator configures zones on the backend DNSSEC-capable authoritative DNS server;

Keys are generated and zones are signed using these keys on the backend authoritative DNS server.

Key management and zone management are performed by the backend authoritative DNS server.

The GSLB switch front-ends this backend DNSSEC-capable authoritative DNS server. Specifically in one embodiment, an administrator may configure the authoritative DNS server as a real/remote server on the GSLB switch with "dns proxy" under the server configuration. An administrator may configure a VIP address on GSLB switch and bind that VIP address to this authoritative DNS server. This VIP address may be published as the DNS VIP address.

An administrator may specify domains on the GSLB switch for which the GSLB switch is to perform GSLB.

An administrator may perform other GSLB configuration as needed on the GSLB switch (for example, GSLB site configuration, GSLB policy configuration, etc.).

When/if the DNSSEC query is sent by the client local DNS to the DNS VIP on the GSLB switch, then the GSLB switch forwards this query to the backend DNSSEC-capable authoritative DNS server.

The authoritative DNS server generates the DNSSEC response containing the RRs and the associated signature(s) for this DNSSEC query.

If this response is for a type A or type ANY query, then the GSLB switch of one embodiment modifies this response to place the best IP address (an A record) on the top before sending the response to the client local DNS server, else the GSLB switch sends the response unaltered to the client local DNS server.

In one embodiment, the GSLB-DNSSEC solution is usable both for user datagram protocol (UDP) and transmission control protocol (TCP) DNSSEC queries. The GSLB-DNSSEC solution of one embodiment also supports GSLB canonical name (cname)-detection capability on the GSLB switch for DNSSEC.

FIG. 4 illustrates an example configuration for a GSLB-DNSSEC implementation according to one embodiment. FIG. 4 has some similarities to FIG. 2 with respect to the example VIP addresses configured on each of the devices (e.g., GSLB switch 300, authoritative DNS server 302, site switches 304 and 306, local DNS server 308, client 310, etc.) and the arrangement of the various devices relative to each other. Differences are that the authoritative DNS server 302 of FIG. 4 is DNSSEC-capable and that at least one resource record signature (RRSIG) is generated by the DNSSEC-capable authoritative DNS server 302 for the RR set (having one or more address records A) contained in the DNSSEC response. The RRSIG accompanies the DNSSEC response/reply received by the GSLB switch 300 from the DNSSEC-capable authoritative DNS server 302.

In the DNS proxy mode of one embodiment, the GSLB switch 300 performs two kinds of modifications to the DNSSEC responses received from the backend authoritative DNS server:

The GSLB switch 300 re-orders the IP addresses in the response and places the best IP address (an A record) on the top and moves the IP address currently at the top of the response somewhere else in the list, for example the best address and the address previously on top may swap positions on the list.

The GSLB switch 300 modifies the TTL value of these resource records to 10 seconds (for example) by default. The TTL value is configurable in one embodiment.

Typically, if any RRSET in the DNSSEC response is modified, then the RRSIG associated with this RRSET will need to be recomputed. However in spite of the two modifications made by the GSLB switch 300 as described above, one embodiment of the GSLB-DNSSEC solution does not need to re-compute/re-calculate the RRSIG (signature) associated with the A records in the DNSSEC response received from the authoritative DNS server 300 because of the following provisions of the DNSSEC mechanism as specified in the DNSSEC RFCs:

(A) The DNSSEC-capable authoritative DNS server first places the RRs for an RRSET in a canonical order and then computes the RRSIG (signature) for that RRSET. Similarly, the client local DNS server that validates this signature also computes/generates the signature by placing the RRs in the DNSSEC response in canonical order when generating the signature. The local DNS server then compares its computed signature to the signature contained in the RRSIG record to determine if they match and determines that the addresses are valid if there is a match of the signatures.

It is noted that this canonical ordering by the local DNS server 308 is simply for the purpose of generating and validating signatures; the RRs are still stored on the resolver (e.g., the local DNS server 308) in the order that they were received from the GSLB switch 300 or other network device. This means that the GSLB re-ordering (which places best A record on top) performed by the GSLB switch 300 will not be affected by the canonical ordering by the local DNS server 308.

As a result, even though the GSLB switch 300 of one embodiment modifies the order of the A Resource Records (e.g., IP address records) in the DNSSEC response received from the backend DNSSEC-capable authoritative DNS server 302, the GSLB switch 300 does not need to re-compute the RRSIG (signature) because the validating client local DNS server 308 receiving this response will order these A records in canonical order for the purpose of signature verification. Therefore, the GSLB switch 300 may perform reordering of the addresses without recalculation of a new signature to replace the original signature that was generated by the DNSSEC-capable authoritative DNS server 302, such that the GSLB switch 300 outputs the DNSSEC reply having the reordered addresses and the same original signature that was generated by the DNSSEC-capable authoritative DNS server 302—the GSLB switch 300 preserves the original signature or signatures generated by the DNSSEC-capable authoritative DNS server 302.

(B) The GSLB switch 300 of one embodiment modifies the TTL value for the A records in the DNSSEC response received from the DNSSEC-capable authoritative DNS server 302. This operation leads to a change in the TTL value of the A records that was used by the DNSSEC-capable authoritative DNDS server 302 to compute the RRSIG (signature). Despite this change to the TTL value, the GSLB switch 300 also does not need to re-compute the original signature because the DNSSEC RFCs state that the validating client local DNS server 308 should first replace the TTL value of the RRs (which has been modified to 10 seconds, for example, by the GSLB switch 300) with the TTL value contained in the RRSIG (which the GSLB switch 300 does not modify and which remains unchanged after GSLB processing) before the local DNS server 308 computes the signature that will then be compared (for verification purposes) to the original signature contained in the RRSIG record.

As such, the GSLB switch 300 of one embodiment can output the DNSSEC reply having the original signature, with a modified TTL value for the resource records in the DNSSEC reply, and with an original TTL value for the original signature—the GSLB switch 300 thus preserves the original TTL value for the original signature.

In one embodiment, the TTL value for the signature and the signature are two separate fields in the RRSIG record. The TTL value of the signature is also "contained" in the signature, in that the TTL value is used to compute the signature as explained above.

Features of one or more embodiments of the GSLB-DNSSEC solution include but are not limited to the following:

Users/administrators and their system may use their existing backend DNSSEC-capable authoritative DNS servers while providing GSLB capability using a GSLB switch 300 without having to delegate the zone authority and DNSSEC management functions to the GSLB switch 300.

Key transfers from the backend authoritative DNS server 302 to the GSLB switch 300 are not needed in the approach disclosed herein, since the GSLB switch 300 need not perform DNSSEC operations. Thus, administrators do not have to deal with security concerns and management overhead related to key transfers and key storage on the GSLB switch 300.

The GSLB switch 300 does not need to perform any additional DNSSEC key generation or key maintenance tasks.

The DNSSEC responses do not need to be re-signed after GSLB has been performed on the DNSSEC response received from the backend authoritative DNS server 302. This ensures high GSLB performance.

The solution(s) disclosed herein supports GSLB for UDP and TCP DNSSEC responses, GSLB cname-detection for DNSSEC, and seamlessly forwards NSEC/NSEC-3 responses from the backend DNSSEC-capable authoritative DNS server 302 to the client local DNS server 308.

FIG. 5 are flowcharts that show the various operations performed by the DNSSEC-capable authoritative DNS server 302 and the GSLB switch 300 or other GSLB switch shown and described herein according to one embodiment. For the sake of simplicity of explanation, the flowcharts of FIG. 5 will be described in the context of the GSLB switch 300 and the DNSSEC-capable authoritative DNS server 302. The various operations depicted in the flowcharts of FIG. 5 may be implemented in one embodiment by software or other computer-readable instructions stored on a tangible or non-transitory computer-readable medium and executable by one or more processors. For example, such computer-readable instructions may be stored in memory present in the GSLB switch 300 and executed by the controller 401.

The operations depicted in the flowcharts of FIG. 5 need not necessarily occur in the exact order shown. Moreover, certain operations may be modified, combined, removed, added, etc. according to various embodiments.

In FIG. 5, the operations performed by or on the DNSSEC-capable authoritative DNS server 302 may include:

zone configuration (500);

the server generates keys and signs the RRsets for the zone (502). This operation could be performed automatically on the DNSSEC-capable authoritative DNS server;

the server performs DNSSEC management functions (including key management) (504);

the server provides DNSSEC responses for DNSSEC queries (506);

the server provides DNS responses for DNS queries (508).

In FIG. 5, the operations performed by or on the GSLB switch 300 may include:

configuration of authoritative DNS VIP address on the GSLB switch (510). This configuration binds the DNSSEC-capable authoritative DNS server to this VIP address and enables dns-proxy for the server;

configuration of the domains for which this GSLB switch will perform GSLB (512);

the GSLB switch learns domain IPs for the GSLB domains from the backend authoritative DNS server (514);

the GSLB switch manages a local GSLB site (if any) configured on it (516);

the GSLB switch sends all DNSSEC/DNS queries to the backend DNSSEC-capable authoritative DNS server (518);

the GSLB switch performs GSLB on all type A/ANY DNS and DNSSEC responses, for example, from the backend authoritative DNS server and updates counters (520). As previously explained above, such GSLB may be performed by the GSLB switch 300 in one embodiment so as to preserve an original signature generated by the DNSSEC-capable authoritative DNS server 302 for the resource record set contained in the DNSSEC reply.

The following provides a sample configuration of a GSLB switch (such as the ADX product) for the DNSSEC-GSLB solution according to one embodiment:

```
ServerIronADX 1000#sh running-config
! Building configuration...
! Current configuration : 776 bytes
!
ver        12.0.00dT401
!
context default
!
server real rs1 192.168.13.1
    port dns
    port dns proxy
!
server real rs2 192.168.13.10
    port http
    port http keepalive
    port http url "HEAD /"
!
!
server virtual vs1 192.168.13.150
    port dns
    port http
    bind dns rs1 dns
!
server virtual vs2 192.168.13.26
    port http
    bind http rs2 http
!
gslb policy
    metric-order set health-check
gslb site self
    si 192.168.13.100
gslb dns zone mydnssec.com
    host-info www http
!
aaa authentication web-server default local
no enable aaa console
logging buffered 1000
logging console
telnet server
ip address 192.168.13.100 255.255.255.0
username admin password .....
no-asm-block- till-boot up
!
End
```

In one embodiment and as explained previously above, certain GSLB-DNSSEC statistics may be computed, tracked, collected, compiled, etc. In one embodiment, the counter(s) and/or syslog server 409 may be used for such data collection, compilation, etc. For example, a number of counters can be provided at the GSLB switch or elsewhere in the system to track the DNSSEC and DNS response processing and best IP address selection when performing GSLB.

The following command line interface (CLI) commands may be used to display counters related to GSLB-DNSSEC processing on the GSLB switch (such as the ADX product):

```
SYNTAX: show gslb global-statistics
ServerIronADX 1000#show gslb global-statistics
DNS proxy statistics:        =    4      UDP response       = 5
TCP response
Query type A                 =    8      Query type ANY     = 1
DNSSEC response              =    3
DNS cache proxy stat:             0
Direct response              =
DNS query intercept stat:         0      Direct response    = 0
Redirect                     =
Unsupported query types stat:     0
Error handling cnt           =
```

| Counter | Description |
|---|---|
| TCP response | Number of TCP responses processed by the GSLB switch |
| UDP response | Number of UDP DNS responses processed by the GSLB switch |

-continued

| | |
|---|---|
| Query type A | Number of Type A queries processed the GSLB switch |
| Query type ANY | Number of Type ANY queries processed the GSLB switch |
| DNSSEC response | Number of DNSSEC responses processed by the GSLB switch |

The above counters of one embodiment are aggregate global counters for all the domains for which the GSLB switch is performing GSLB.

The following CLI command may be used to display counters related to GSLB selection statistics on the GSLB switch (such as the ADX product):

```
SYNTAX: show gslb dns detail
ServerIronADX 1000#show gslb dns detail
ZONE: mydnssec.com
HOST: www:
(Global GSLB policy)
GSLB affinity group: global
```

| | | | | | | Flashback delay (x100us) | | DNS resp. selection counters |
|---|---|---|---|---|---|---|---|---|
| | | | | | | TCP | APP | Count |
| (%) | 192.168.1.18: | dns | real-ip | DOWN | N-AM | -- | -- | 0 (0%) |
| * | 192.168.1.19: | dns | real-ip | DOWN | N-AM | -- | -- | 0 (0%) |
| * | 192.168.1.20: | dns | real-ip | DOWN | N-AM | -- | -- | 0 (0%) |
| * | 192.168.1.21: | dns | real-ip | DOWN | N-AM | -- | -- | 0 (0%) |
| * | 192.168.1.22: | dns | real-ip | DOWN | N-AM | -- | -- | 0 (0%) |
| * | 192.168.1.23: | dns | real-ip | DOWN | N-AM | -- | -- | 0 (0%) |
| * | 192.168.13.25: | dns | real-ip | ACTIVE | N-AM | 11 | 7 | 5 (55%) |
| * | 192.168.13.26: | dns | v-ip | ACTIVE | N-AM | 0 | 0 | 4 (44%) |

```
Active Bindings: 1
site: self, weight: 0, SI: 192.168.13.100
session util: 0%, avail. sessions: 7999976
preference: 128
Metric counter (count [selection-metric]):
4[least-response]
```

| Field | Description |
|---|---|
| IP address | Domain IP address |
| Dns | Indicates that domain IP was learned from backend DNS server |
| Real-ip/v-ip | Real-ip: Domain IP is a Host<br>v-ip: Domain IP is a Virtual IP configured on a Brocade SI. |
| ACTIVE/DOWN | Domain IP health (ACTIVE, DOWN) |
| DNS response selection counters | Number of times domain IP has been selected as best IP for this domain. |
| Metric counter (relevant only if domain IP is v-ip) | The number of times a metric has been used to select this IP as best IP. The sum of all these should be equal to the DNS response selection counter. |

The above domain IP counters may be maintained per domain in one embodiment.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the embodiments to the precise forms disclosed. While specific embodiments are described herein for illustrative purposes, various equivalent modifications are possible. These and other modifications can be made in light of the above detailed description.

What is claimed is:

1. A method comprising:
receiving, by a load balancer, a Domain Name System Security Extensions (DNSSEC) response from a DNS server that is located remotely from the load balancer over a network, the DNSSEC response including a list of IP addresses and an original security signature associated with the list of IP addresses;
reordering, by the load balancer, the list of IP addresses in the DNSSEC response based on one or more metrics, the reordering being performed while preserving the original security signature; and
transmitting, by the load balancer, the DNSSEC response with the reordered list of IP addresses and the original security signature to a client device that is located remotely from the load balancer over the network.

2. The method of claim 1 further comprising, prior to the reordering:
determining whether the DNSSEC response is a Type A response or a Type ANY response.

3. The method of claim 2 wherein, if the DNSSEC response is not a Type A response or a Type ANY response, the load balancer transmits the DNSSEC response to the client device without performing the reordering.

4. The method of claim 1 wherein the security signature is generated by the DNS server.

5. The method of claim 1 further comprising, prior to the reordering:
parsing the DNSSEC response to identify the list of IP addresses and the security signature.

6. The method of claim 1 further comprising, by the client device:
receiving the DNSSEC response with the reordered list of IP addresses and the unmodified security signature;

placing the reordered list of IP addresses into a canonical order; and verifying the unmodified security signature based on the canonical order.

7. The method of claim 1 wherein the list of IP addresses is contained within a resource record set of the DNSSEC response.

8. The method of claim 7 wherein the security signature is contained within a resource record signature (RRSIG) record of the DNSSEC response.

9. The method of claim 8 further comprising:

modifying, in the resource record set, a time-to-live (TTL) value for a first IP address in the list of IP addresses.

10. The method of claim 9 wherein a copy of the TTL value for the first IP address is included in the RRSIG record, and wherein the modifying of the TTL value for the first IP address in the resource record set does not modify the copy of the TTL value in the RRSIG record.

11. The method of claim 10 further comprising, by the client device:

receiving the DNSSEC response with the modified TTL value in the resource record set and the unmodified copy of the TTL value in the RRSIG record; and replacing, in the resource record set, the modified TTL value with the unmodified copy.

12. The method of claim 1 wherein the load balancer is a network switch.

13. A system comprising:

a processor; and a non-transitory computer readable medium having stored program code which, when executed by the processor, causes the processor to:

receive a DNSSEC response from a DNS server that is located remotely from the load balancer over a network, the DNSSEC response including a list of IP addresses and an original security signature associated with the list of IP addresses;

reorder the list of IP addresses in the DNSSEC response based on one or more metrics, the reordering being performed while preserving the original security signature; and transmit the DNSSEC response with the reordered list of IP addresses and the original security signature to a client device that is located remotely from the load balancer over the network.

14. The system of claim 13 wherein the DNS server is configurable to generate the security signature included in the DNSSEC response.

15. The system of claim 14 wherein the client is configurable to:

receive the DNSSEC response with the reordered list of IP addresses and the unmodified security signature;

place the reordered list of IP addresses into a canonical order; and verify the unmodified security signature based on the canonical order.

16. A non-transitory computer readable storage medium having stored thereon program code executable by a load balancer, the program code comprising:

code that causes the load balancer to receive a DNSSEC response from a DNS server that is located remotely from the load balancer over a network, the DNSSEC response including a list of IP addresses and an original security signature associated with the list of IP addresses;

code that causes the load balancer to reorder the list of IP addresses in the DNSSEC response based on one or more metrics, the reordering being performed while preserving the original security signature; and code that causes the load balancer to transmit the DNSSEC response with the reordered list of IP addresses and the original security signature to a client device that is located remotely from the load balancer over the network.

17. The non-transitory computer readable storage medium of claim 16 wherein the list of IP addresses is contained within a resource record set of the DNSSEC response.

18. The non-transitory computer readable storage medium of claim 17 wherein the security signature is contained within a resource record signature (RRSIG) record of the DNSSEC response.

19. The non-transitory computer readable storage medium of claim 18 wherein the program code further comprises:

code that causes the load balancer to modify, in the resource record set, a TTL value for a first IP address in the list of IP addresses.

20. The non-transitory computer readable storage medium of claim 19 wherein a copy of the TTL value for the first IP address is included in the RRSIG record, and wherein the modifying of the TTL value for the first IP address in the resource record set does not modify the copy of the TTL value in the RRSIG record.

* * * * *